Figure 3:
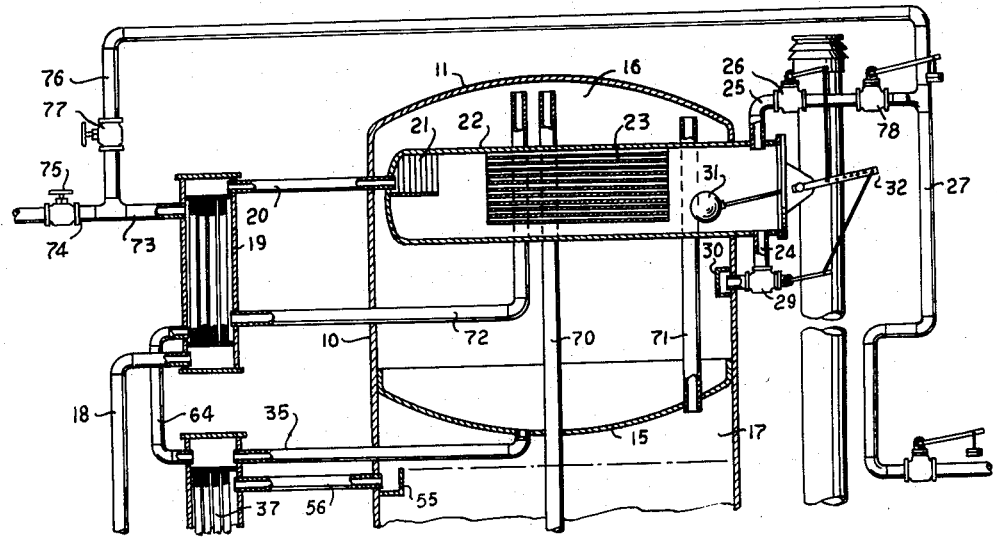

Aug. 9, 1960  J. P. WALKER ET AL  2,948,352
EMULSION TREATING METHOD AND MEANS
Filed Aug. 16, 1957  9 Sheets-Sheet 1
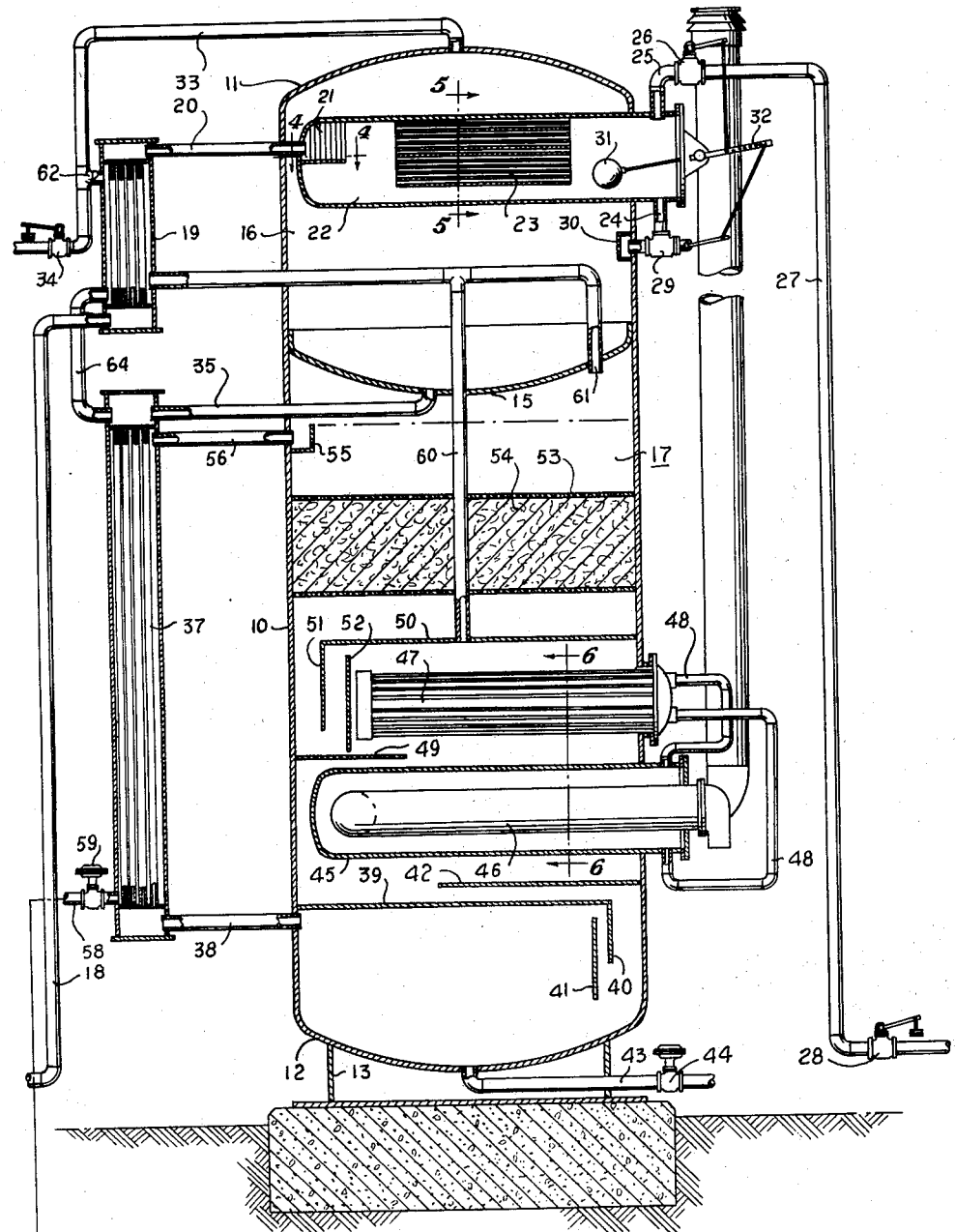
Fig. 1
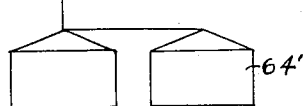
INVENTORS
Jay P. Walker
Joseph L. Maher
BY *Ashley & Ashley*
ATTORNEYS

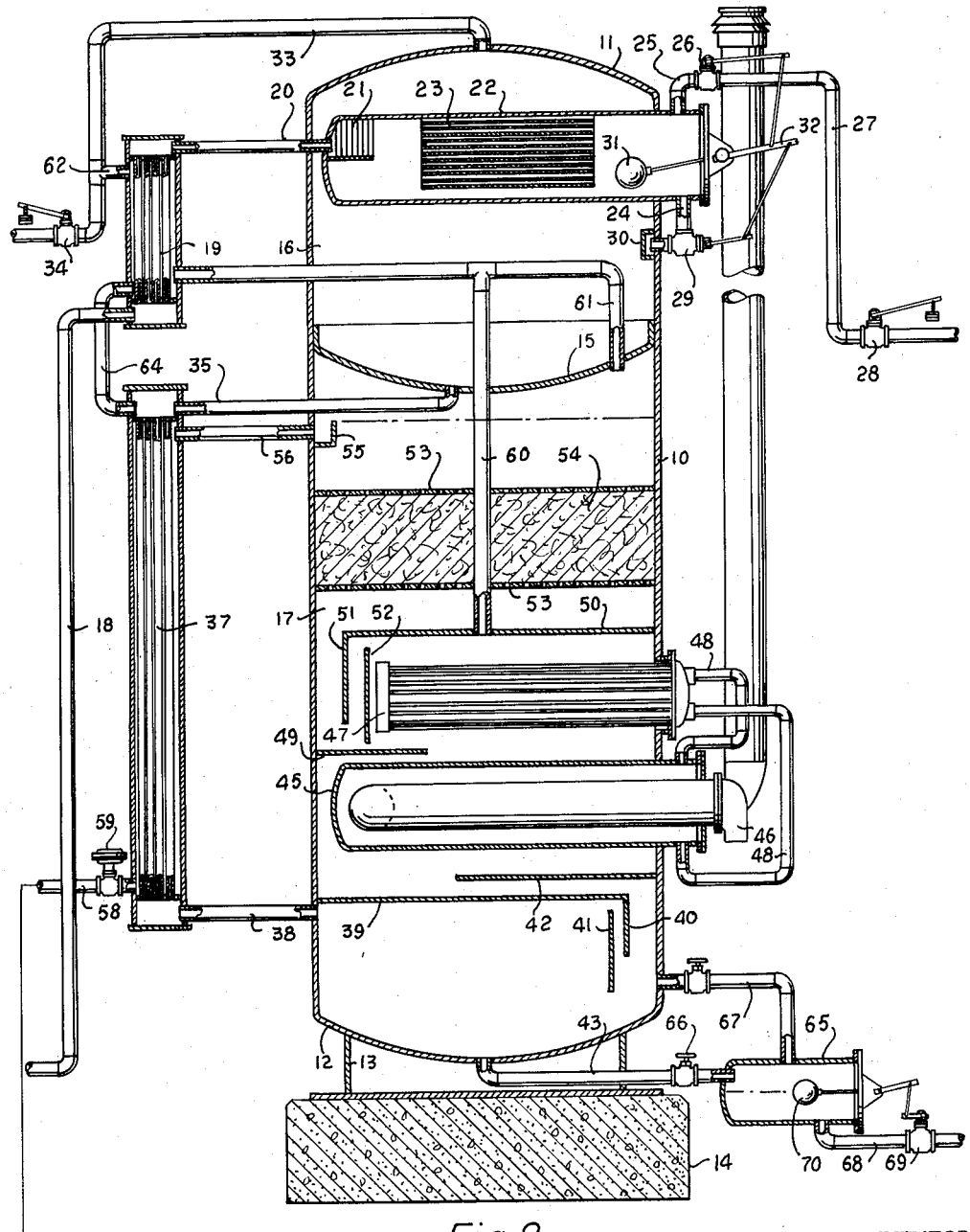
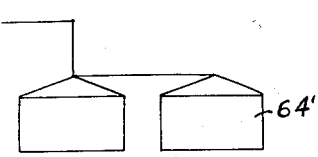
Fig. 2
INVENTORS
Jay P. Walker
Joseph L. Maher
BY *Ihley & Ihley*
ATTORNEYS INVENTORS
Jay P. Walker
Joseph L. Maher
BY Ashley & Ashley
ATTORNEYS INVENTORS
Jay P. Walker
Joseph L. Maher Aug. 9, 1960 J. P. WALKER ET AL 2,948,352
EMULSION TREATING METHOD AND MEANS
Filed Aug. 16, 1957 9 Sheets-Sheet 8
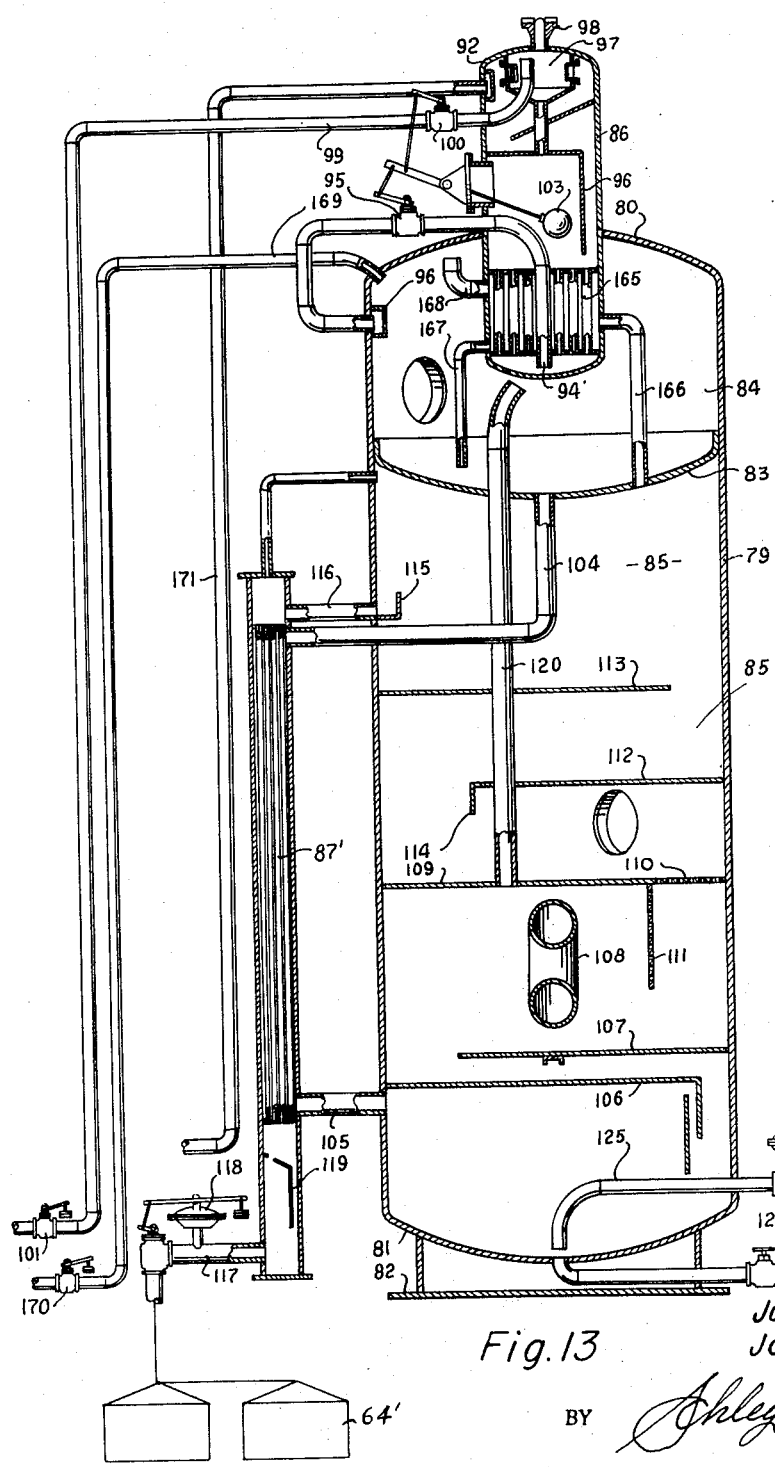
Fig.13
INVENTORS
Jay P. Walker
Joseph L. Maher
BY 
ATTORNEYS

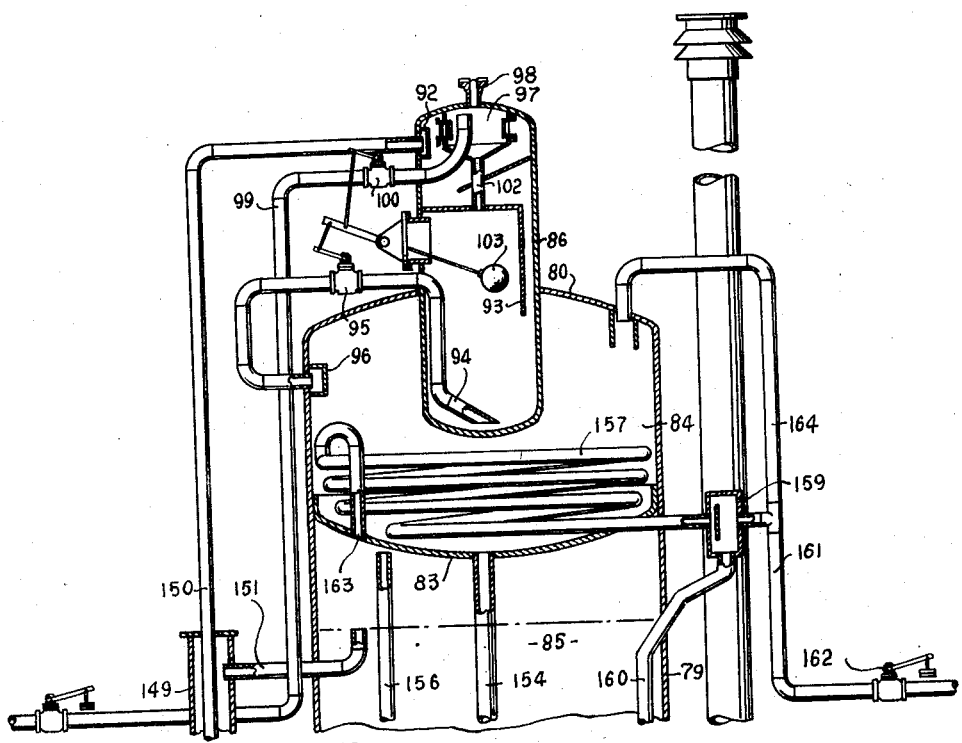

United States Patent Office 2,948,352
Patented Aug. 9, 1960

2,948,352

EMULSION TREATING METHOD AND MEANS

Jay P. Walker and Joseph L. Maher, Tulsa, Okla., assignors to National Tank Company, Tulsa, Okla., a corporation of Nevada Filed Aug. 16, 1957, Ser. No. 678,737

31 Claims. (Cl. 183—2.7)

This invention relates to new and useful improvements in emulsion treating methods and means.

The invention is particularly concerned with the treating of emulsified well streams in stages and under successive pressure drops whereby oil of higher gravity, that is, oil containing more light fractions, is recovered, the oil is more completely stabilized, and to a considerable extent, only that gas which cannot be maintained in solution and retained in storage with the oil, is removed.

In recovering storable and marketable oil from conventional well production streams in which no emulsions are encountered, it has been a practice in the case of high and moderately high pressure well streams to carry out a gas and oil, or gas, oil, and water, separation in several steps or stages, each succeeding stage being maintained at a pressure lower than the preceding stage, and the final stage being either the storage tanks or vessels or a low pressure gas and oil separator. This has become known as stage separation, and for a well stream of a given composition, the pressures at which the several separation stages should be operated may be rather accurately calculated or determined. The greater the number of stages of separation, the more efficient and effective the separation of gas and oil becomes, but at the same time, the expense of installation of the numerous separator vessels, as well as their maintenance and operation, becomes excessive. Accordingly, it has been the practice to use two, three, or four separation stages, the stock tanks or storage vessels functioning in many instances as the last stage of three or four stage separation systems. Thus, a relatively high pressure well may be produced into a first oil and gas, or oil, gas and water separator operating at a pressure of 1100 pounds per square inch, the separated liquids being passed to a second stage separator operating at a pressure of from 175 to 250 pounds per square inch, followed by the liquids accumulated in the second separator being passed to a third separator operating at a pressure of 5 to 25 pounds per square inch. The recovered liquids may be conducted from the last or third stage separator to stock or storage tanks, and the overall result obtained through the utilization of the several stages of separation will be observed as removal of a minimum quantity of gas from the well stream consistent with proper and stable storage of the recovered liquids, the separated gas being relatively free of recoverable liquids, and the separated liquids being relatively free of gas which may not be retained in storage with the liquids in stock or storage tanks maintained at atmospheric pressure or slightly thereabove. In contrast, if the same well stream were passed through only one or two separators before being conducted to the storage tanks, there would be greater evolution of gas from the separated liquids in the storage tanks, accompanied by the usual loss of light and valuable hydrocarbons carried from the stored liquid with the evolving gas, and the separated gases would not be as thoroughly denuded of recoverable and retainable hydrocarbons.

In spite of the quite considerable additional expense involved in a stage separation system, the systems have been found quite worthwhile and the expense fully justified in proper types of well stream production due to the greater oil recoveries obtained, and also due to the more effective removal of all recoverable liquids from the separated gas.

There are also many producing wells in which the well stream is partially or fully emulsified and in which the emulsion must be completely broken or resolved in order to recover marketable oil. The nature and composition of these emulsion streams vary widely, but a reasonably typical emulsified stream may be stated to contain gas, some free water, an oil-in-water, or more likely, a water-in-oil, emulsion, possibly some relatively free or loosely bound oil, and quantities of gas dissolved or held in the liquid phases, but predominantly in the oil-containing phases. In some instances in which the well stream is produced at a relatively high pressure, an initial separator is employed for removing some of the gas content of the well stream, and possibly some of the free water. The bulk of the liquids, however, are then passed to an emulsion treater, with or without the injection of emulsion treating chemicals, and in the treater, the stream is subjected to various separation and heating steps, followed by a temporary retention of the heated stream to allow it to resolve and stratify into water and clean oil which may be withdrawn separately. Here again there has existed the problem of carrying out the gas, oil and water separation with utmost efficiency in order that the gas may be freed as fully as possible from recoverable hydrocarbons with maximum quantities and gravities of clean oil being recovered for sale. Heretofore, this problem has not been solved in many instances, and the overall production of marketable oil, along with more complete oil and gas separation has not always reached the performance levels desirable or requisite under strict conservation practices.

It is apparent that the stage separation type of system could be employed for these emulsified streams, but this entails emulsion treaters operating at relatively high pressures of the magnitude of 175 to 250 pounds per square inch, and manifestly, emulsion treaters adapted to operate at such pressure ranges would be very costly, and would be both expensive and dangerous to operate. Emulsion treaters are relatively large vessels, usually ranging from four feet to ten feet in diameter, and must normally contain some means for heating the oil to elevated temperatures. Obviously, a large vessel operated at such elevated pressures and temperatures would be exorbitantly expensive for use in most instances, and would be a constant hazard to operating personnel. Further, in order to obtain a retainable oil product from an emulsion treater operating at pressures of this magnitude, the well stream would have to be heated to very high temperatures in order to free the oil of dissolved gas. As an example, an emulsion treater operating at 50 pounds per square inch might be required to heat the well stream to 200° to 400° Fahrenheit in order to produce an oil product, or clean oil, which could be retained in the usual storage or stock tanks. Accordingly, it is clear that the direct application of stage separation principles to the breaking and separation of emulsified well streams into their water, oil, and gas components, is not feasible.

It is, therefore, a principal object of this invention to provide improved methods and means for utilizing the principles and advantages of stage separation in connection with the treating and breaking of well stream emulsions.

A further object of the invention is to provide an improved method and means for treating emulsified well streams in which the well stream is carried through a first separation zone at an elevated pressure and the separated liquids are then discharged into a second separation zone at a lower pressure, the liquids from the second separation zone being conducted into a heating zone for further evolution of gas and warming of the emulsion stream to a temperature sufficient to result in breaking or resolution thereof into its water and clean oil components.

A still further object of the invention is to provide an improved method and means for the treating of emulsion streams in which the foregoing objectives are carried out in a single vessel or enclosure, thereby reaping the advantages of condensation of vapors and heat exchange between various fluids passing through the emulsion treating equipment.

An additional object of the invention is to provide improved methods and means for the treating of emulsified well streams in which the well stream is subjected to a degree of preheating under relatively high pressure prior to a first gas separation under such relatively high pressure, after which the residual liquid is taken through a second gas separation step at a lower pressure and then heated at such lower pressure to carry out the breaking of the emulsion, and the vapors evolved in the heating step carried into condensing relationship with the incoming emulsion stream with or without commingling of the gases and vapors removed in the second separation step.

A further object of the invention is to provide improved methods and means of the character described in which any condensed vapors are returned to the residual liquids flowing from the second separation step to the heating step whereby any possible contamination of the separated clean oil by such condensates is avoided.

A still further object of the invention is to provide improved methods and means of the character described wherein heating means are provided in the heating zone and the gases and vapors evolved in the area of the heating means are conducted directly into indirect heat exchange relationship with the incoming emulsion stream for maximum condensation of light, recoverable hydrocarbons.

Yet another object of the invention is to provide improved methods and means of the character described in which vapors evolved in the heating step are carried into prolonged and amplified heat exchange relationship with the incoming emulsion stream for optimum condensation of light hydrocarbons and thorough denuding of the separated gas of recoverable and retainable liquid hydrocarbons.

An important object of the invention is to provide improved methods and means for the treating of emulsion streams in which the stream is first carried through a series of gas separation steps at progressively lower pressure levels, the liquids recovered in the terminal step then being heated for resolution of the emulsion and the driving off of a gaseous fraction which may be selectively separated by cooling into retainable light liquid hydrocarbons and denuded gas which could not be retained in solution in the clean oil in conventional storage vessels.

An additional object of the invention is to provide improved methods and means for the treating of emulsion streams in which the stream is first carried through a series of gas separation steps at progressively lower pressure levels, the liquids recovered in the terminal step then being heated for resolution of the emulsion, depending on the nature of the well stream being processed, vapors from a second separation step being condensed by heat exchange with an earlier step, or the second step functioning to protect the zone of the earlier step from freezing temperatures, the separated liquids undergoing thorough mixing between the steps, and in some cases, the gas from the earlier step flowing to the subsequent step whereby loss of liquids through the gas outlet is prevented.

A construction designed to carry out the invention will be hereinafter described, together with other features of the invention.

Figure 4:
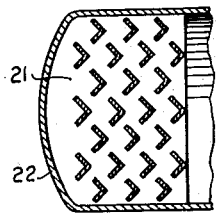
Figure 5:
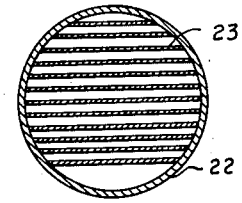
Figure 6:
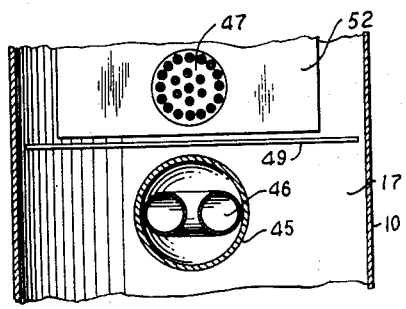
Figure 7:
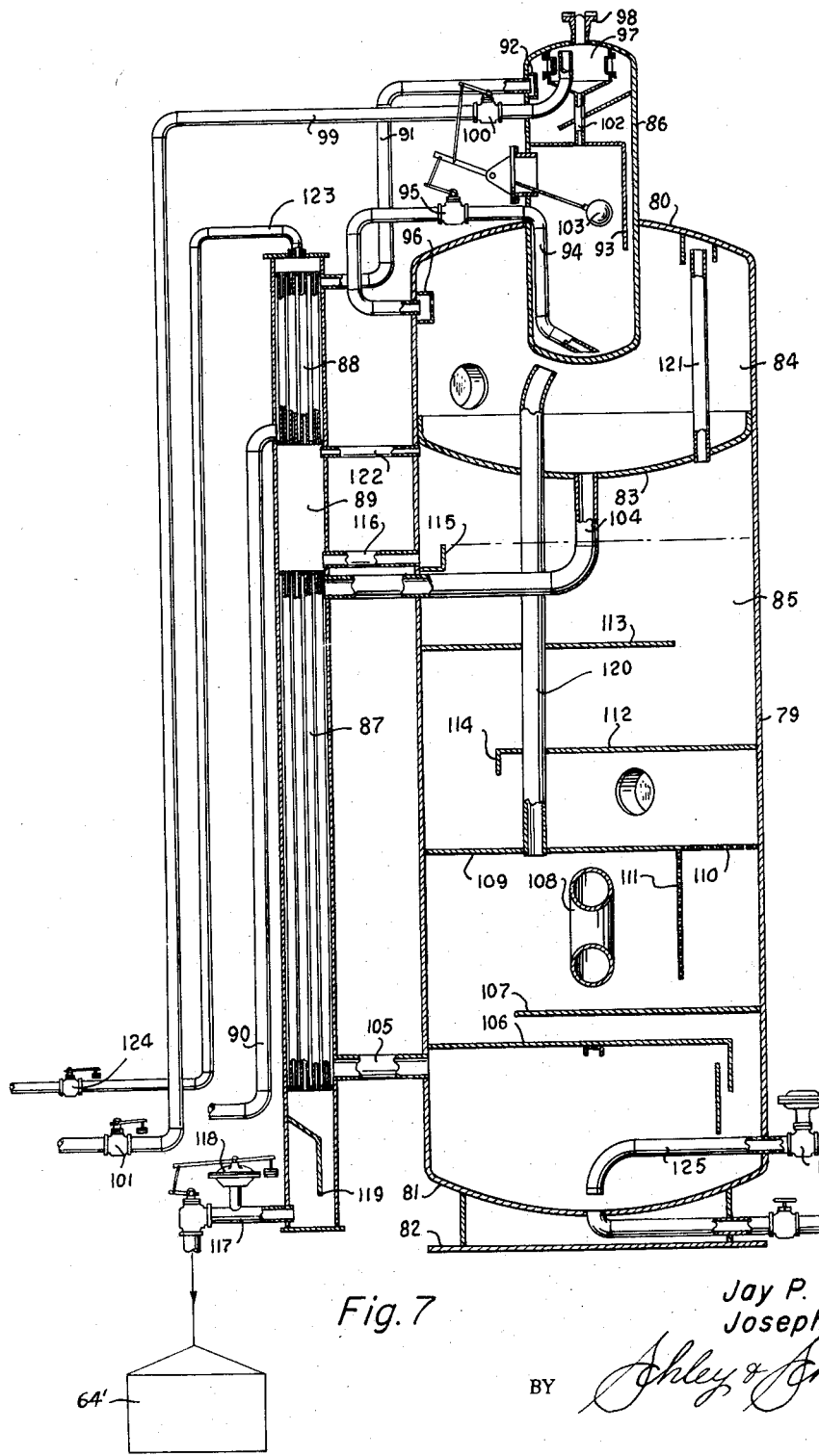
Figure 8:
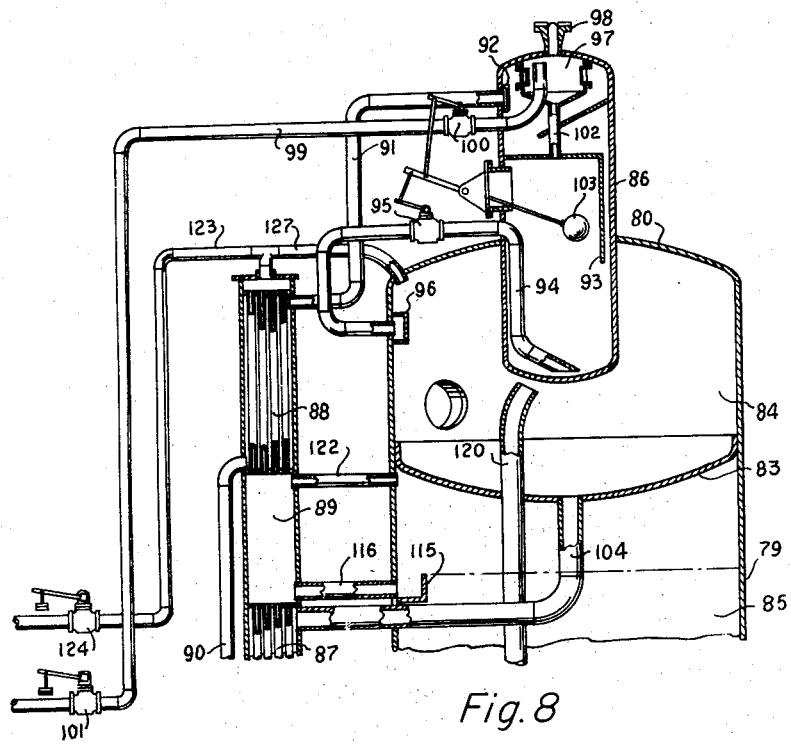
Figure 10:
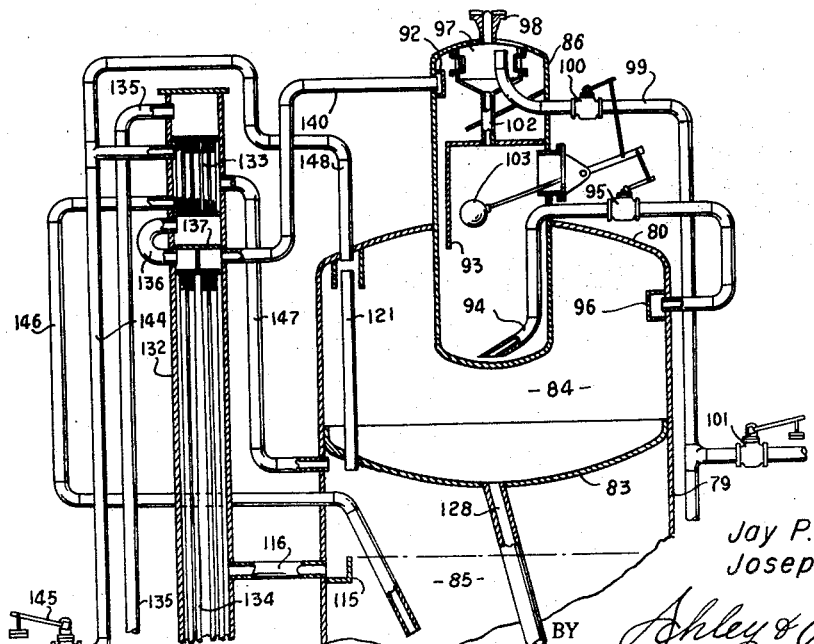
Figure 9:
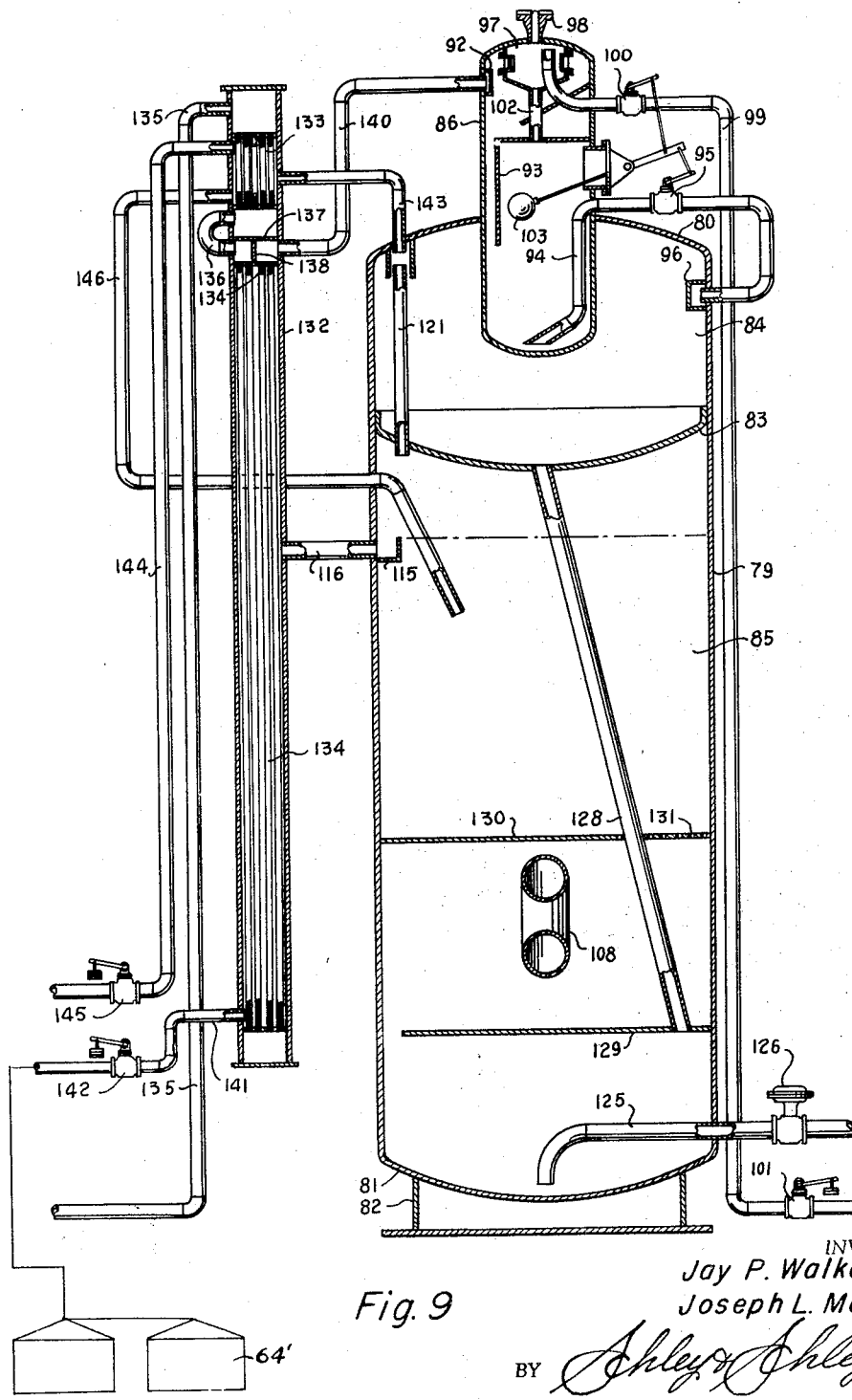
Figure 11:
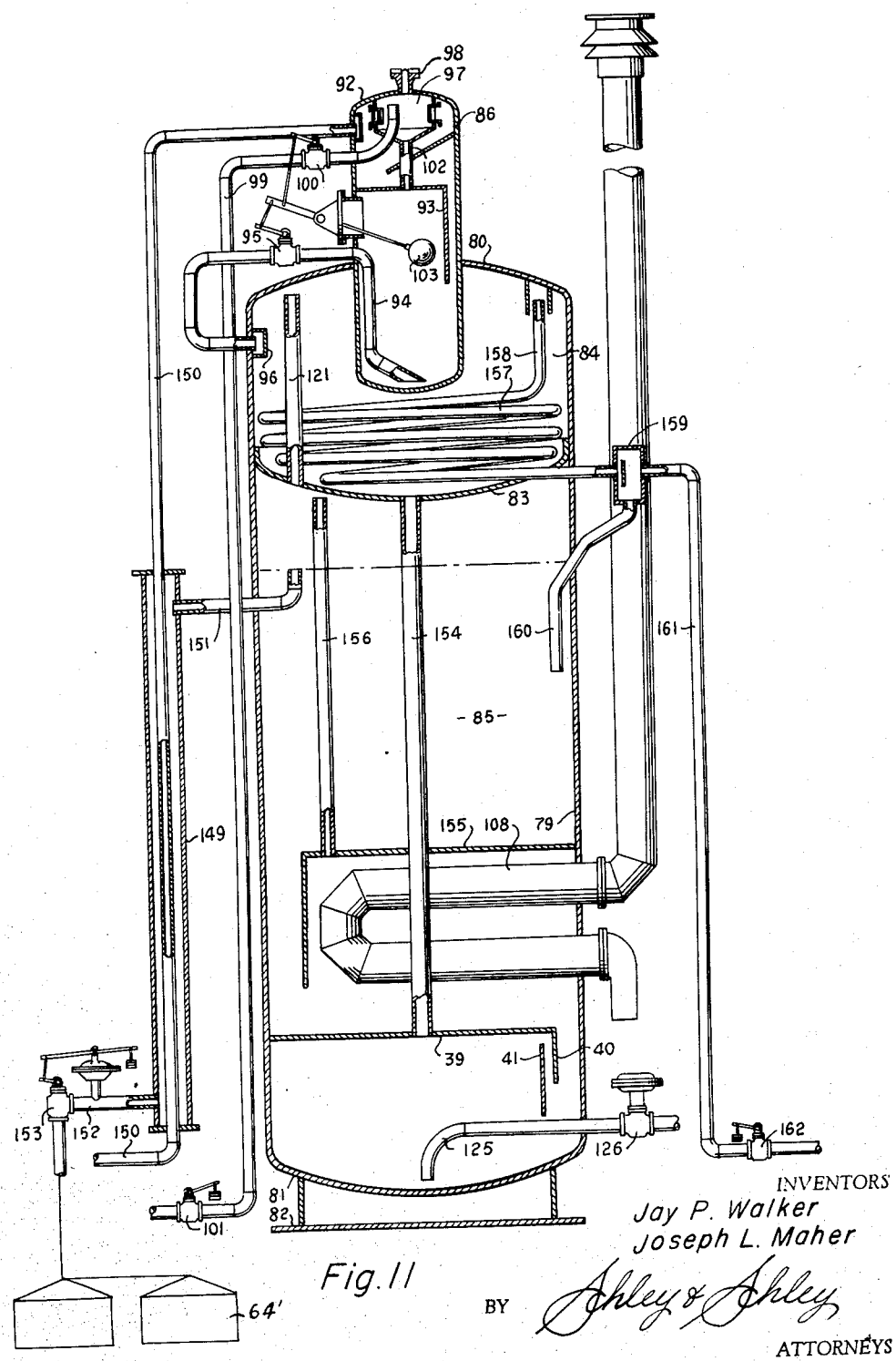

The invention will be more readily understood from a reading of the following specification and by reference to the accompanying drawings, wherein examples of the invention are shown, and wherein:

Fig. 1 is a vertical, sectional view of an emulsion treater constructed in accordance with this invention and adapted to carry out the methods thereof, Fig. 2 is a vertical, sectional view of an emulsion treater similar to the treater of Fig. 1 but including a modified water withdrawal structure, Fig. 3 is a vertical, sectional view of the upper portion of a modified form of the mulsion treater of Fig. 1, Fig. 4 is a horizontal, cross-sectional view taken upon the line 4—4 of Fig. 1, Fig. 5 is a vertical, cross-sectional view taken upon the line 5—5 of Fig. 1, Fig. 6 is a vertical, sectional view taken upon the line 6—6 of Fig. 1, Fig. 7 is a vertical, sectional view of a further modification of the emulsion treater, Fig. 8 is a vertical, sectional view of a modification of the emulsion treater of Fig. 7, Fig. 9 is a vertical, sectional view of a further modification of the emulsion treater, Fig. 10 is a vertical, sectional view of the upper portion of a modification of the emulsion treater of Fig. 9, Fig. 11 is a vertical, sectional view of a still further modification of the treater, Fig. 12 is a vertical, sectional view of the upper portion of a modification of the treater of Fig. 11, Fig. 13 is a vertical, sectional view of yet another modification of the emulsion treater, all of the illustrated treaters being adapted to carry out the methods disclosed herein, and Fig. 14 is a vertical, sectional view of the upper portion of still another modification of the invention.

The invention contemplates the passage of the emulsified well stream, with or without initial passage through a condenser for the liquefaction of vapors evolved in the subsequent heating step, into a relatively small separation enclosure operated at a moderately high pressure, which may be of the magnitude of 25 pounds per square inch to 250 pounds per square inch or higher, in which an initial gas separation from the well stream is carried out. Being relatively small, or at least of relatively small diameter, the initial or first stage separation enclosure, which may be of the vertical or horizontal types, is relatively inexpensive to manufacture, and may be incorporated into the upper portion of an emulsion treater vessel as illustrated in the drawings. The separated gas is separately withdrawn from the first stage vessel at the operating pressure thereof, and the separated liquids are discharged from the enclosure, desirably through some liquid level controlled discharge means which functions to withdraw separated liquids from the first stage enclosure, and, in certain instances, to interrupt gas withdrawal as required to insure sufficiently rapid and adequate flow of liquids from the enclosure.

Being positioned in the upper portion of the emulsion treater structure, the first stage separator is in heat exchange with certain portions of the treating structure and with gases and vapors evolved and flowing therein. As described more fully hereinafter, this positioning may desirably be employed to aid in condensation of evolved vapors, as well as to afford a unitary and compact treating structure, or in the alternative, to protect the first stage separator from low temperatures.

The separated liquids withdrawn from the first stage separator are directed into a second stage separator enclosure or chamber which operates at a somewhat lower pressure, desirably 5 to 25 pounds per square inch, and in most cases of the order of magnitude of 5 pounds per square inch, this second separator chamber forming the upper portion of a main emulsion treating vessel and receiving in its upper part the first stage separator. Certain quantities of gas will have been separated and removed in the first stage separator, and upon discharge of the separated liquids into the second stage separator, further quantities of gas will be separated, this orderly and step-wise removal of gas in zones of successively decreasing pressure resulting in a much more effective separating operation whereby maximum quantities of gas and light hydrocarbons are retained within the liquid portions of the well stream, while the evolved gases contain very little if any liquefiable hydrocarbon fractions which could ultimately be retained in storage with the clean oil which is recovered. The forming of the second stage separator enclosure in the upper portion of the treating vessel also affords numerous opportunities for direct and indirect heat exchange relationship between the various liquids and vapors to most effectively conserve the heat available as well as to bring all of the various fluids to the most desirable temperature level as they progress from step to step of the system.

Following the second separation stage, the separated liquids are flowed, preferably by gravity, into a heating zone, desirably preceded by an area for removal of any free water which may be present, and from the heating zone, the liquids are directed to an area of stratification in which the emulsion may complete its breaking and stratification into water and clean oil layers. The clean oil is withdrawn in heat exchange relationship with the liquids flowing from the second separation stage to the heating zone, or with other suitable liquids or fluids, while evolved gases and vapors are carried into condensing relationship with the liquids in the first separation zone, the liquids in the second separation zone, the liquids passing through the condenser prior to entry into the first stage separation zone, or with several of these various liquids and fluids. The gas withdrawn in the second stage separation zone may be commingled with the gases and vapors evolved in the heating and treating zone prior to passage in the aforesaid heat exchange relationships, or may be separately withdrawn for commingling with the denuded gases flowing from the treating zone and from which condensable hydrocarbons have been removed. The latter procedure is often desirable since the gases evolved in the second stage separation zone are usually reasonably devoid of condensable constituents and may serve only to dilute the evolved vapors from the treating zone to render more difficult the condensation of fractions therefrom. The condensates may be returned to the clean oil, or more desirably, may be returned to the liquid in the second separation zone or the liquid flowing to the heating zone to eliminate any possible contamination of the clean oil by water vapors condensed from the fluids evolved in the treating zone. Also, in certain of the modifications of the invention, means is provided for trapping vapors evolved at the heating unit and conducting these vapors directly to the condenser or condensing surfaces. In some instances, emulsion treaters tend to surge by evolution of excessive quantities of vapor or other causes, and in such occurrence, quantities of dirty oil or emulsion may be caused to flow upwardly through the hot vapor conductors into the condenser or condensing area. Obviously, such material should not be returned to the clean oil layer, and for this reason also it is desirable that the condensates, along with any emulsion or dirty oil which may inadvertently enter into the condensing area, be returned to a portion of the structure apart from the clean oil layer whereby opportunity is afforded for further breaking and separation of this material, and contamination of the clean oil layer thereby is avoided.

The separated clean oil is desirably passed into heat exchange with the incoming emulsion stream, or with the liquids flowing from the second stage separation step to the heating zone, or both, and any suitable arrangement for this preheating or heat exchange step may be employed. In most instances, the emulsion will have been resolved into water and clean oil under a pressure of a few pounds per square inch, and thorough cooling of this oil before storage is desirable in order to retain therein all of the light hydrocarbons and certain quantities of the dissolved gas. Of course, preheating of the emulsion stream immediately prior to the final heating thereof serves to conserve the heat input applied to the treater as well as aid in the separation of free water which may be present as such in the emulsion stream or in the form of loosely bound emulsion. Any suitable or desirable heating means may be employed for heating the emulsion stream, steam or direct fired heaters, electric heaters, and indirect heaters of the water, water-vapor, or heat exchange liquid types being readily usable in either the water or oil layers present within the heating and treating zone.

Turning now to specific embodiments of the invention, in Fig. 1, the numeral 10 designates an upright cylindrical vessel having a domed head 11 at its upper end and a dished bottom 12 at its lower end carried upon a suitable support member 13 and foundation 14. A dished partition 15 in the upper portion of the vessel 10 but spaced below the head 11, encloses with the head 11 a second stage separation chamber 16 above the partition 15, and a stratification and emulsion heating and treating chamber 17 below the partition 15.

An emulsion or well stream inlet conductor 18 leads into the lower end of the tube side of a tube and shell condenser 19, and a second inlet conductor 20 leads from the upper end of the tube side of the condenser into the inlet separator 21 of a horizontal oil and gas separator 22 positioned in the upper portion of the chamber 16 and within the vessel 10. As shown in Fig. 4, the separation unit 21 of the separator 22 is of the vertical, spaced baffle type, and is effective both to absorb the flowing impetus of the well stream as well as to remove bodies of liquid and large liquid particles therefrom. These separated liquids, of course, gravitate into the lower portion of the separator 22 for subsequent removal. The separated gas flows longitudinally of the separator 22 in an elongate path and passes between a plurality of spaced, longitudinally-extending plates or trays 23 provided in the medial portion of the separator 22, the trays 23 extending generally horizontally and being of the general type illustrated in the U.S. patent to Dixon, No. 2,349,944. The closely spaced trays provide a plurality of wide, shallow, ribbon-like flow passages through which the gas and portions of the other well fluids may flow whereby liquid particles need settle only a very short distance before wetting one of the plates and adhering thereto. In this manner, the gas is substantially denuded of liquid particles, and virtually all of the liquids present in the well stream are collected for accumulation and withdrawal through a liquid outlet 24 extending from the lower portion of the separator 22. The denuded gas is removed through a gas outlet 25 extending from the upper portion of the separator 22 and leading through a lever-operated valve 26 and a gas discharge conductor 27 to a suitable back pressure valve 28.

The valves 26 and 28 may be combined into a single structure, or may constitute two separate valve structures. Throughout this specification, whenever a lever or power-operated valve is illustrated in conjunction with a back pressure valve, it is to be understood that a single, combination valve may be employed in lieu thereof.

The liquid discharge conductor 24 connects through a power or lever-operated valve 29 with a diverter inlet 30 positioned on the inner wall of the chamber 16 exteriorly of the separator 22, and a suitable liquid level responsive means, such as the float 31 is adapted to operate an actuating lever 32 which is linked to the valves 26 and 29 exteriorly of the separator 22. Obviously, a pilot valve or other actuating means may be employed in place of the lever 32 in order to open and close the valves 26 and 29 by the admission and exhaust of a fluid under pressure, by means of electrical connection or by any other suitable or desirable means. The interconnection of the valves 26 and 29 with the float 31 results in closing or partial closing of the valve 26 when the float is elevated to open the valve 29 whereby the internal pressure within the separator 22 is increased for accelerated discharge of liquids therefrom. Thus, should surges of liquid enter the separator 22, or should excessive quantities of liquid accumulate therein for any reason, provision is made for insuring the rapid discharge of said liquid by increasing the pressure to force the liquid outward through the outlet 24. When the separator 22 is operated at pressures in excess of 100 pounds per square inch, the provisions for closing the gas outlet valve for liquid discharge need not always be employed.

The valve 28 maintains a back pressure on the separator 22 at all times of the magnitude of 25 to 250 pounds per square inch or more, the valve 26 only being closed momentarily or at intervals to increase the normal operating pressure of the separator 22 additionally for accelerated discharge of liquids. Being of relatively small diameter, the vessel 22 may readily be operated at pressures of 175 to 180 pounds per square inch or more without being excessively expensive or of particularly heavy construction, and thus, an initial gas and liquid separation phase or zone is provided for separation of gas from the well liquids at elevated pressure without incurring the expenses, difficulties, and dangers of operating an entire emulsion treater at such elevated pressures. The discharged gas is thoroughly denuded of liquid particles, and the liquid is separated from much of its gas for subsequent discharge into the chamber 16 at a somewhat lower pressure for further and orderly step-wise or stage separation of the gas.

Within the chamber 16, the liquids separated in the vessel 22 are released into a relatively large area at considerably reduced pressures of the magnitude of 5 to 25 pounds per square inch, and under these conditions and with the relatively long residence or retention time provided for the liquids within the large chamber 16, further evolution and separation of gas from the liquids takes place. Thus, a second step or stage in the separation process is provided resulting in the removal of substantially liquid-free gas composed almost entirely of fixed gases such as methane and ethane, and the discharge from the chamber 16 of liquids which have lost or been relieved of by far the major portion of their gas content.

Dependent upon the pressure, composition, and other characteristics of the well stream being handled, the temperatures, pressures, and so forth, existent in the chamber 16 and the vessel 22 will vary considerably. Usually the gas released in the chamber 16 is richer than that released in the separator 22 in that it will contain more condensible vapors having been evolved at lower pressures. Often, the liquids in the second stage will be colder than those of the first stage since there will have been a pressure reduction, but even so, these liquids and gases in the second stage will be sufficiently warm to protect the separator 22 against freezing due to cold weather conditions.

On the other hand, when the well stream is relatively free of gas and large quantities of light hydrocarbons, and is flowing at a relatively low rate, condensation of vapors evolved in the second stage on the surface of the separator 22 may be expected to occur. Further, under either condition, freezing of the separator 22 is prevented, and the passing of the liquids from the first stage to the second through a short conductor having therein a valve, insures the thorough mixing of the liquids with any emulsion treating or breaking chemical which may have been added thereto.

The gases separated in the chamber 16 flow upwardly over the exterior wall of the separator 22 for any condensation that may take place thereon and are then discharged from the upper end of the vessel through a gas outlet pipe 33 having therein a suitable back pressure valve 34 for maintaining on the chamber 16 the desired and predetermined operating pressure. The separated liquids are discharged from the lower portion of the chamber 16 through a conductor 35 leading from the partition 15 into the upper end of the tube side of a heat exchanger 37, and are discharged from the lower end of the tube side of the heat exchanger through a conductor 38 leading into the lower portion of the vessel 10. A body of accumulated liquids is maintained in the lower portion of the vessel 10, and the separated liquids are discharged thereinto from the conductor 38 beneath a transverse baffle or partition 39 which terminates short of the wall of the vessel opposite the conductor 38 and is provided with a depending skirt or lip 40 having a transverse vertical baffle 41 positioned closely adjacent thereto beneath the partition 39. Quantities of free water and loosely bound emulsion may be present in the liquids entering through the conductor 38, and by temporary retention of the well liquids beneath the partition 39, opportunity is afforded for free water to separate and settle therefrom, and for some of the looser emulsified particles to break and separate into water and oil due to heat absorbed in the heat exchanger 37 and/or downwardly through the partition 39. The provision of the vertical baffle 41 causes the lighter portions of the incoming liquids, that is those liquids immediately beneath the partition 39, to be first withdrawn over the upper edge of the baffle 41 and beneath the skirt 40 to flow upwardly within the vessel into impingement with a semi-partition 42 extending across the vessel 10 toward the side thereof opposite the skirt 40. The water and heavier portions of the emulsified stream are retained for lengthened periods of time to afford further opportunity for separation and settling, the water being withdrawn through a water outlet conductor 43 leading from the bottom of the treating vessel through an outlet control valve 44 which may be of any suitable or desirable type. Of course, in all of the modifications of the invention described herein, a conventional internal or external water leg may be substituted for the water outlet conductor 43 and any suitable or desirable means may be employed for controlling the rate of water discharged from the vessel.

Within the vessel 10 and above the semi-partition 42, there is provided an indirect heating unit of the general type shown and described in the U.S. patent to Glasgow Re. No. 23,628, and which includes a lower heating tube or chamber 45 containing a body of heat transfer or heat-vaporizable fluid and a fire tube 46, and an upper heating member in the form of a bundle of heat exchange tubes 47 having circulation connections 48 for receiving hot heat exchange medium from the lower chamber 45. Such a heating assembly provides for uniform and controlled heating of the fluids present within the vessel 10, but it is pointed out that electrical heating, steam coil heating, direct-fire fire tube heating, or any other suitable or desirable type of heating means may be employed within the vessel for heating the fluids therein.

The well fluids pass circuitously and upwardly in intimate contact with the heating member, being diverted from side to side of the vessel 10 by reason of their passage from beneath the semi-partition 42 as well as an additional semi-partition 49 positioned between the upper and lower heating members 45 and 47. A second hood or retention partition 50 is provided in the vessel 10 above the uppermost heating unit 47 and carries a depending lip or skirt 51 positioned closely adjacent a vertical, transverse skimming partition 52 provided beneath the hood 50 and being similar to the partition 41. Here again, the fluids are momentarily trapped for thorough heating and to afford opportunity for emulsion breaking and separation, the lightest fluids, that is the fluids containing the largest percentage of clean oil, being withdrawn first from immediately beneath the partition 50 and skimmed over the upper edge of the partition 52 to flow downwardly and beneath the skirt 51 and upwardly into the upper portion of the chamber 17 of the vessel which constitutes primarily a separation and stratification zone. Of course, separated water gravitates downwardly to the lower portion of the treating vessel for removal therefrom, the clean oil, and possibly some partly or almost completely broken emulsion flowing upwardly into the upper portion of the chamber 17. A pair of perforated or foraminous plates 53 are provided in spaced relationship within the vessel above the hood 50 and enclose a body of filter material 54, such as wood excelsior, hay, and the like, for providing a coalescing and final separation zone for complete resolution of the emulsified well constituents and separation thereof into clean oil and water components. The clean oil accumulates above the partitions 53 and is withdrawn through a weir box 55 into a conductor 56 leading into the upper end of the shell side of the heat exchanger 37 wherein the clean oil undergoes intimate and effective heat exchange with the relatively cool liquids passing downwardly from the chamber 16 in order that clean cool oil may be discharged from the lower end of the shell side of the heat exchanger through a clean oil outlet conductor 58 and an oil discharge valve 59 which may be of any suitable or desirable type. At the same time, the well stream fluids passing from the chamber 16 into the lower portion of the chamber 17 beneath the partition 39 are preheated for more effective emulsion treating and breaking as well as for conservation of heat and return of this heat to the interior of the vessel 10.

A large portion of the gas and vapor evolution in the lower section 17 of the emulsion treating vessel will occur in the proximity of the heating unit, and these vapors, necessarily rising rather quickly through the fluids present within the treater, will be trapped beneath the hood or partition 50. A gas and vapor exhaust conductor 60 leads upwardly from the hood 50 through the perforated partitions 53 and the partition 15 into the chamber 16 wherein the conductor 60 is connected into the second gas and vapor conductor 61 leading upwardly from the uppermost portion of the chamber 17 through the partition 15 and laterally through the side wall of the vessel 10 into the lower end of the shell side of the condenser 19. An uncondensed gas and vapor outlet connection 62 leads from the upper portion of the shell side of the condenser 19 into the gas outlet conductor 33, and a condensate drain or conductor 64 leads from the lower portion of the shell side of the condenser 19 into the upper portion of the tube side of the heat exchanger 37. Some vapors collected beneath the hood will be condensed in passing upwardly through the conductor 60, and especially in the uppermost portion thereof which is within the relatively cool chamber 16, but the larger percentage or portion of the condensables will be recovered within the condenser 19 wherein the relatively warm gases and vapors are passed in intimate and dispersed heat exchange relationship with the cool incoming emulsion stream flowing through the tube side of the condenser. Similarly, gases and vapors evolving from the surface of the clean oil layer in the uppermost portion of the chamber 17 will condense on the relatively cool underside of the partition 15, while the remaining gases and vapors will pass upwardly through the conductor 61 to the condenser 19 for thorough cooling and condensation of those light hydrocarbons which may be effectively returned to the liquid state and commingled with the liquid portions of the well stream.

It is to be noted that any water vapors which may be condensed in the condenser 19 will be returned not to the clean oil layer, but to the emulsified stream flowing downwardly through the tube side of the preheater 37, and similarly, any dirty oil or emulsion erupting upwardly through the conductor 60 due to the rapid or excessive formation of gas or vapor bubbles beneath the hood 50 will be returned also through the condenser 19 to the preheater 37 for ultimate flow into the lower portion of the treating chamber 17 and complete resolution into water and clean oil components.

In the operation of this form of the invention, the incoming emulsion stream is passed first through the condenser 19 for the cooling and condensation of vapors and gases evolved in the heating and treating chamber of the emulsion treater, and then, at relatively high pressure, into the first stage separator 22. Herein, gas is scrubbed and removed from the well stream at relatively high pressure, the thoroughly denuded gas being withdrawn through the outlet conductor 27 and the liquids being flowed at reduced pressure into the chamber 16 while being protected from freezing. Thus, the first stage of gas separation is carried out, and the first stage of removal of uncondensable and unretainable gas from the well fluids.

The chamber 16 is operated at a somewhat lower pressure than the separator 22, and therein additional quantities of gas are scrubbed and removed from the well fluids at a lowered pressure, the gas separation thus taking place in successive stages of constantly reducing pressure whereby only that gas is removed which may not be retained in the liquids ultimately delivered to the clean oil storage tanks, and the controlled evolution and separation of gas from the liquids is carried out under such conditions as to prevent the gas from carrying therewith quantities of light hydrocarbons and liquids which might ultimately be recovered as a salable product.

From the chamber 16, the separated liquids are withdrawn and subjected to a degree of warming or preheating in the preheater 37 prior to discharge into the lower portion of the chamber 17 wherein free water is separated and the remaining fluids are carried upwardly for heating to break and resolve the emulsified components. Gases and vapors occurring in the heating area are carried directly upwardly to the condenser 19 to avoid the creation of turbulence and agitation in the upper portion of the chamber 17 whereby the heated well liquids and fluids passing upwardly into this portion of the chamber 17 are maintained in a relatively quiet and non-turbulent area for most effective separation and stratification into water and clean oil. The clean oil is withdrawn while transferring its heat content to the incoming well fluids whereby a cool and relatively stabilized product is delivered to the clean oil storage tanks or vessels, the separated water is withdrawn through the conductor 43, and the evolved gases and vapors, after heat exchange with the underside of the partition 15, are carried into the condenser 19 along with gases and vapors from beneath the hood 50 for thorough cooling by the well stream and effective condensation and recovery of liquefiable components. Thoroughly denuded gas at relatively high pressure is discharged through the conductor 27, and thoroughly scrubbed and cleaned gas at a somewhat lower pressure is discharged through the conductor 33 and back pressure valve 34.

In this manner, the well stream is subjected to a gas separation step at high pressure, followed by a gas separation step at a lower pressure, and it is then heated for final evolution of gas and vapors, the condensable portions of the gases and vapors being properly cooled for return into the well fluid stream to produce a cool and storable clean oil product containing substantially all of the liquids and dissolved gases which are retainable in conventional storage vessels operating at atmospheric pressure or slightly thereabove. The discharged gas is almost completely stripped of liquid particles and light hydrocarbon fractions which are retainable, and thus there is provided an emulsion treating process carried out in stages which equals in the final products obtained much more expensive systems and types of equipment involving stabilization towers and elavorate scrubbing or absorption equipment.

The emulsion treating processes and apparatus disclosed and claimed herein are adapted to handle various types of petroleum production in which greater or lesser quantities of emulsified well stream constituents may occur. The invention is directed primarily to the handling of well streams flowing at pressures of several hundred pounds per square inch or more and finds its greatest usefulness under those conditions, but at the same time, it is adapted to produce beneficial and improved results in the case of well streams flowing at somewhat lower pressures of the magnitude of 20 to 50 pounds per square inch.

Where the well is flowing at a sufficiently high pressure, it may be determined by calculation that the optimum pressure for the first stage of gas separation may be of the magnitude of 1100 pounds per square inch, and normally, this first stage gas separation step will be carried out in a suitable oil and gas separator. The withdrawn liquids may then be conducted into the first stage separator of the emulsion treater apparatus of Fig. 1 at a pressure of 175 to 250 pounds per square inch, in the case of 1100 pounds per square inch first separation vessel, the proper operating pressure for the separator 22, again by calculation, being in the neighborhood of 175 to 180 pounds per square inch. The separating chamber 16 and the emulsion resolving chamber 17 then may be operated at a pressure of 5 to 25 pounds per square inch and the clean oil discharged into storage vessels, indicated schematically in the drawings and identified by the numeral 64', maintained at atmospheric pressure or a pound or two per square inch thereabove.

Of course, a preliminary oil and gas separator upstream of the emulsion treater may not always be employed, and under such conditions, the separator 22 will be operated and maintained at a pressure found empirically or by calculation to provide optimum gas separation with maximum liquid recovery and maximum denuding of the gas exhausted through the outlet 27. Necessarily, the operating pressure maintained in the separator 22 determines to a large extent the operating pressure maintained in the chambers 16 and 17, but in all events, the pressures are set at levels at which maximum denuding of the separated gas is obtained along with optimum quantities of retainable and marketable petroleum products. Within the emulsion treating chamber 17, the emulsion stream is primarily resolved into a gas product which itself may be separated in the condenser 19 into a heavy fraction that can be condensed and retained in the clean oil to increase the gravity and value of the oil, as well as the volume thereof, and a light gas fraction which could not be retained in the clean oil storage tanks and hence is driven off for removal through the gas outlet conductor 33. While the treating chamber 17 may be operated at pressures of the magnitude of 25 pounds per square inch, somewhat lower pressures, such as 5 pounds per square inch, are to be desired since at this pressure the well fluids can be heated to normal treating temperatures of 150 to 200 degrees Fahrenheit to produce a clean oil product that may be discharged directly to storage tanks without loss or excessive evolution of gas and light hydrocarbon fractions. If the treating enclosure were operated at a pressure of the magnitude of 50 pounds per square inch, it would be necessary to heat the well fluids to temperatures of 200 to 400 degrees Fahrenheit to produce a stable clean oil product which could be discharged to stock tanks without excessive loss, and obviously, the maintenance of the treating chamber at such elevated temperatures is both expensive and dangerous. Accordingly, in most instances the treating chamber will be operated at a pressure of a few pounds per square inch, for instance 5 to 10 pounds per square inch, and to maintain proper stage separation relationships, the separator 22 will be operated at pressures of 175 to 200 pounds per square inch.

At the same time, the vessel 22 may be maintained at pressures of 25 to 50 pounds per square inch and effective gas separation and emulsion treating obtained in the chambers 16 and 17 under pressures of 2 or 3 to 5 pounds per square inch.

Of course, where the operating pressure of the separator 22 is in excess of 100 pounds per square inch, the dual control apparatus represented by the valves 26 and 29 jointly operated by the float 31 may not be necessary since the pressures within the separator 22 will always be adequate for insuring rapid discharge of liquids therefrom. In such case, the valve 26 might be omitted and only the valve 28 relied upon for maintaining the desired back pressure in the separator 22, while the float 31 would function merely to open and close the liquid discharge valve 29 in accordance with the rate of accumulation of liquids within the separator 22.

Approaching the matter from another viewpoint, the purpose of the invention is to produce maximum quantities of clean oil of maximum gravity which can be retained in storage tanks or vessels under atmospheric pressure or pressures slightly thereabove, and at the same time, to avoid the utilization of emulsion treating temperatures much in excess of 200 degrees Fahrenheit, treating temperatures of 150 to 180 degrees Fahrenheit usually being considered normal. Under these conditions, and assuming that the equivalent of three stage gas separation is to be obtained, the chambers 16 and 17 will be maintained at pressures of 5 to 10 pounds per square inch, the separator 22 will be maintained at the intermediate pressure level which may be calculated by well-known procedures as being the optimum pressure for the intermediate stage of separation for the pressure and composition of the well stream being produced, while a conventional upstream oil and gas separator will be operated and maintained at a pressure determined or calculated most suitable for the first stage of separation. The pressures in the upstream separator and the separator 22 may vary widely, dependent upon well conditions, but they may readily be calculated in reverse order starting from the operating pressure of the chambers 16 and 17 in order to establish operating pressure levels for most effective and efficient separation of all gas which cannot be retained in storage, the removal of all recoverable liquids from the gas, and the production of thoroughly clean oil of the highest possible gravity and volume which may be retained in storage under normal procedures.

It must be kept in mind that the recovered clean oil, to constitute a retainable stock tank product, must be freed of excess light or fixed gases, such as methane and ethane, which cannot be retained in solution in the oil under storage conditions. Since methane is evolved or driven from the clean oil largely in proportion to pressure reduction rather than by increase of temperature, it becomes apparent that effective removal of these fixed gases requires a fairly low operating pressure for the chambers 16 and 17. Otherwise, excessively high temperatures must be employed for driving off of the methane and other fixed gases, and expensive, difficult, and dangerous operating conditions are encountered. It is for this reason that the terminal pressure within the emulsion treater should be maintained at a low level, and desirably, as low as possible consistent with thorough gas denuding and optimum recovery of salable petroleum.

Turning now to Fig. 2 of the drawings, there is illustrated therein a modified form of the emulsion treating apparatus of Fig. 1 and in which the same numerals have been employed to identify similar elements. The primary change in the modification of Fig. 2 resides in the means for withdrawal of separated water, there being employed a small external volume tank 65 into which the water drain connector 43 is connected through a conventional cutoff valve 66. The volume tank 65 has at least a portion disposed below the lowermost part of the vessel 10 and is provided with an equalizing connection 67 extending from its upper part into the vessel 10 above the bottom of the latter. A water discharge conductor 68 leads from the lower portion of the volume tank 65 through a valve 69 operated by a suitable float or other liquid level responsive means 70 positioned within the volume tank 65. With this arrangement, the vessel 10 may be maintained full of oil and emulsion at all times, all separated water being immediately withdrawn into the volume tank 65, and the oil-water interface maintained therein by means of the level responsive means 70. This structure is of considerable advantage when corrosive well fluids are encountered since such corrosion is normally most pronounced in the portions of the equipment constantly exposed to the salt or corrosive water present in the well fluids. With the present modification, such corrosion is limited to the relatively small and inexpensive volume tank 65 which may be readily and inexpensively removed and replaced should the corrosion exceed allowable limits. The equalizing connection 67 will maintain the upper portion of the volume tank 65 full of oil or emulsion at all times, while the water drain connector or pipe 43 functions to conduct all separated water immediately from the vessel 10 into the volume tank 65 wherein it gravitates to the lower portion of the volume tank and is removed in accordance with its rate of accumulation through action of the member 70 which is responsive to the interface level between the oil and water to open and close the valve 69 for proper discharge of water.

The modification of Fig. 3 is again very similar to the form of the invention shown in Fig. 1, but the connection of the gas and vapor conductors 61 directly into the condenser 19 is eliminated. Instead, a gas and vapor conductor 70 extends upwardly from the hood 50 through the partition 15 and to the uppermost portion of the chamber 16. Similarly, the conductor 61 is replaced by a pressure equalizing and gas flow conductor 71 extending from the partition 15 into the upper portion of the chamber 16, the commingled gas flows being removed from the chamber 16 through a gas outlet pipe 72 leading from the upper portion of the chamber 16 through the side wall of the vessel 10 into the lower portion of the shell side of the condenser 19. Thus, all of the gas and vapor evolved in the treating compartment 17 of the structure, with the exception of those vapors condensed on the underside of the partition 15, are conducted upwardly into the compartment 16 and therein commingled with gas separated from the emulsion stream entering the compartment 16 through the liquid outlet pipe 24 from the separator 22. The combined gas streams are brought into heat exchange relationship with the relatively cool exterior of the separator 22 and then are removed for final condensation of retainable light hydrocarbons in the condenser 19.

The uncondensed gases and vapors are removed from the upper portion of the shell side of the condenser 19 through a gas outlet pipe 73 from which the gas may be flowed through a discharge conductor 74 having therein a cutoff valve 75 and a suitable back pressure valve (not shown), or through a branch conductor 76 leading through a cutoff valve 77 into the gas discharge pipe 27 extending from the separator 22. In the latter case, in order to maintain the desired pressure differential between the chamber 16 and the separator 22, a suitable back pressure valve 78 should be positioned between the valve 26 and the point of connection of the conductor 76 into the conductor 27.

A somewhat structurally different modification of the invention is illustrated in Fig. 7, but is is pointed out that the general principles of operation and the conservation of recoverable hydrocarbons are essentially the same as in those forms of the invention earlier described. In this modification, the upright emulsion treating vessel 79 is provided with a head 80, a bottom 81 carried upon a suitable support 82, and an intermediate partition 83 spaced below the head 80 and defining an upper separation chamber 84 and a lower emulsion treating and resolving chamber 85. A small vertical separator enclosure 86 is mounted in the head 80 and extends downwardly into the chamber 84 an appreciable distance.

By the side of the vessel 79 there is provided an upright heat exchanger and condensing structure comprising a heat exchanger 87 and a condenser 88 having the lower end of the tube side of the condenser connected in common with the upper end of the tube side of the heat exchanger as shown at 89. An emulsion stream inlet conductor 90 is connected into the lower end of the shell side of the condenser 88, and a well stream conductor 91 leads from the upper portion of the shell side of the condenser into a diverter box 92 provided in the upper portion of the separator 86. A quieting baffle 93 is mounted within the separator 86 below the inlet box 92, and a separated liquids discharge conductor 94 leads from the lowermost portion of the separator 86 externally of the treater structure and through a flow control valve 95 to a diverter box 96 provided in the side wall of the chamber 84. A mist extractor 97 in the upper portion of the separator 86 has a safety head 98 communicating therewith and a gas outlet conductor 99 which leads through a gas control valve 100 and a back pressure valve 101 to a point of use or disposal of relatively high pressure gas. A liquid drain conductor 102 leads from the mist extractor downwardly through the quieting baffle 93, and a float or other level responsive means 103 is positioned within the separator below the quieting baffle for simultaneous operation of the valves 95 and 100 in substantially the same manner in which the float 31 controls the valves 26 and 29. The back pressure valve 101 maintains the separator 86 at the desired pressure level, the gas valve 101 being closed or partially closed in accordance with the accumulation of bodies of liquid within the separator 86 to increase the pressure thereon and insure sufficiently rapid liquid withdrawal through the outlet conductor 94. Of course, a pressure drop takes place in the valve 95 and the chambers 84 and 85 are accordingly operated at a somewhat lower pressure than the separator 86, as previously described.

The fluids entering the chamber 84 through the conductor 94 and diverter box 96 are directed tangentially of the chamber 84, just as occurs in the chamber 16 of the first form of the invention, in order to scrub quantities of gas from the fluids, the gases rising to the upper portion of the chamber 84 for removal and the liquids gravitating onto the partition 83 to maintain the same relatively cool and for drainage into the treating and resolving section of the treating vessel. The relatively large capacity or volume of the chamber 84 insures a prolonged retention or residence time for the fluids passing therethrough whereby ample opportunity is provided for removal of additional quanitties of gas from the liquids and for the system to attain equilibrium under the pressure and temperature conditions present.

The separated liquids are drained from the partition 83 through a conductor 104 extending downwardly therefrom and through the side wall of the treater vessel into the upper portion of the shell side of the preheater 87. An outlet conductor 105 extends from the lower portion of the shell side of the preheater into the lower portion of the treating chamber 85 beneath a skirted partition and baffle structure 106 similar to the partition and baffle 39 and 41. The partition structure 106 terminates short of the right-hand side wall of the vessel 79, as viewed in Fig. 7, and the lighter fluids are preferentially skimmed upwardly beneath the semi-partition 107, similar to the partition 42, into adjacency with a fire tube or other suitable heating means 108 extending transversely of the treating vessel above the partition 107.

A somewhat different type of gas and vapor trapping hood or partition 109 is positioned within the vessel 79 above the fire tube 108 and comprises a plate extending entirely across the treating vessel and having perforations or a foraminous section 110 in its right-hand portion only, as viewed in Fig. 7. A vertical, foraminous or perforated partition 111 depends from the partition 109 between the perforated section 110 and the fire tube 108, and obviously, the heated fluids must pass through both the perforated sections 111 and 110 before flowing upwardly in the vessel. This structure reduces the tendency of the heated fluids to flow directly upwardly through the partition 109 and impedes their flow to an extent sufficient to insure their adequate heating as well as the settling of quantities of separated water therefrom.

An additional pair of staggered baffles 112 and 113 are provided in the vessel above the partition 109, the lower partition 112 desirably having a depending lip or skirt 114 for retarding fluids and holding them temporarily in adjacency with the partition 109 which will be relatively warm due to the presence immediately therebelow of the fire tube 108. A clean oil outlet in the form of a skimmer box 115 communicates from the upper portion of the chamber 85 with a clean oil outlet conductor 116 leading to the tube side of the upper portion of the heat exchanger 87, a clean oil outlet pipe 117 extending from the lower portion of the tube side of the heat exchanger through a suitable flow control valve 118. If desired, a vented guieting baffle 119 may be provided in the lower portion of the heat exchanger 87 for more uniform and turbulence-free oil withdrawal. Further, a coalescing or filtering section may be incorporated into the chamber 85 beneath the partitions 112 or 113 similarly to the section 54 of Fig. 1.

As pointed out previously, the primary point of gas and vapor evolution in the treating chamber 85 is the zone in proximity to the fire tube 108 whereby such gases and vapors tend to collect beneath the partition 109. A gas and vapor vent pipe 120 leads upwardly from the partition 109 through the partition 83 and discharges in close adjacency to the lower end of the separator 86 which, obviously, is maintained relatively cool by reason of the incoming well stream flowing therethrough. Thus, the hot gases and vapors are carried immediately and directly to a cool condensing surface, and quantities of the vapors will be condensed for return to the lower portion of the treating chamber through the pipe 104. Vapors and gases not condensed in the chamber 84 are returned through a gas equalizing pipe 121 to beneath the partition 83 upon which, by reason of its relatively cool condition, additional condensation may occur, and the remaining gases and vapors exit from the treater vessel through a gas outlet pipe 122 leading to the lower portion of the tube side of the condenser 88. The gases and vapors pass upwardly through the tubes of the condenser for condensation of those light hydrocarbon fractions which may be retained in storage, the uncondensed gases and vapors leaving the upper end of the tube side of the condenser by a gas outlet pipe 123 provided with a suitable back pressure valve 124.

The operation of this form of the invention is substantially the same as that previously described, the well stream being taken first through a gas separation step at elevated pressure, after which the separated liquids are conducted to a second stage separation zone in which additional quantities of gas are removed before the liquids are conveyed to the treating section for heating and resolution or breaking of the emulsified components. The clean oil is withdrawn in heat exchange with the incoming emulsion stream, the separated water being taken off through a water outlet pipe 125 extending from the bottom of the vessel 79 through a suitable water outlet control valve 126, and the evolved gases being carried into intimate heat exchange relationship with the lower portion of the separator 86 as well as the underside of the partition 83 before passage through the condenser 88 for final condensation of the liquefiable components which may be present. The well stream is resolved into clean oil of sufficient stability that it may be retained in conventional storage tanks or vessels and a gaseous or vapor fraction which, by condensation, may be separated into retainable light hydrocarbons and denuded gases of such volatility and volume as not to lend themselves to storage tank retention. The discharged gases are thoroughly denuded of liquid particles and liquefiable fractions, and clean oil of maximum volume and gravity is produced.

The modification of the invention illustrated in Fig. 8 of the drawings is substantially the same as that of Fig. 7, the primary difference residing in the method and structure for withdrawing the separated gases. The gas conductor 121 extending between the chambers 84 and 85 is omitted, and instead, only the gases evolved above the clean oil layer are withdrawn through the outlet conductor 122 to pass upwardly through the tube side of the condenser 88. Gases evolved in the chamber 84, and the uncondensed portion of the gases and vapors passing upwardly through the vent 120 into contact with the lower portion of the separator 86, are separately removed from the chamber 84 through a gas outlet conductor 127 connected into the gas outlet pipe 123 above the condenser 88. Thus, the relatively large volumes of lean gas separated from the incoming well fluids within the chamber 84, as well as the gases and vapors not condensed in the chamber 84, are held from admixture with the relatively rich gases discharged through the outlet 122 until after the latter have passed through the condenser 88 and have utilized to the fullest extent the cooling capacity available therein. It is to be noted in both the modifications of Fig. 7 and Fig. 8 that all condensates, other than those that may occur on the underside of the partition 83, are returned to the emulsion stream within the chamber 84, while those condensates occurring in the condenser 88 are returned to the clean oil flowing downwardly through the heat exchanger 87. Any sudden surges or flows of dirty or emulsified oil which may course upwardly through the vent or vapor pipe 120 will only enter the chamber 84 for ultimate return to the lower portion of the treater, and thus, possible contamination of the clean oil by such surging bodies of liquid is prevented.

The form of the invention shown in Fig. 9 is similar to that disclosed in Figs. 7 and 8 insofar as the upper portion of the vessel 79 is concerned, and likewise with respect to utilization of the first stage separator 86. The condenser and heat exchanger arrangement is somewhat different, however, and in addition, the internal structure of the treating compartment has been simplified. In the modification of Fig. 9, the well fluids flowing into the chamber 84 from the separator 86 are conducted directly downwardly from the partition 83 through a flume 128 extending downwardly within the vessel 79 to beneath a spreader partition 129 provided in the lowermost portion of the vessel and underlying the fire tube 108. The partition 129 terminates short of the left-hand side of the treater vessel, as viewed in Fig. 9, and the flume 128 extends through the partition 129 near the right-hand wall of the vessel. Thus, the well fluids are caused to flow transversely of the vessel in order that free water may separate therefrom, the remaining fluids passing upwardly into adjacency with the fire tube 128 and being caused to flow across the vessel for full heating results by reason of the partition 130 extending transversely of the vessel above the fire tube 108 and having a perforated portion 131 on its right-hand side. The separated water is withdrawn through the water outlet conductor 125 and valve 126, as described in connection with Fig. 7, while the clean oil is skimmed off through the weir box 115 and clean oil outlet conductor 116.

In the modification of Fig. 9, a somewhat different condenser and preheater structure is utilized, the structure including an elongate shell 132 having the condenser section 133 positioned in its upper portion, and the preheater section 134 occupying its lower portion. The well stream is admitted through an inlet conductor 135 into the upper portion of the tube side of the condenser 133, and flowed from the lower portion of the tube side of the condenser through a short, external, U-shaped conductor 136 into the space below a transverse partition 137 provided within the shell 132 and separating the condenser from the preheater. A baffle 138 depends from the partition 137 to the upper tube sheet 139 of the preheater and hence divides the preheater tubes into two sections. Accordingly, the well fluids are caused to flow downwardly through the left-hand preheater tubes, as viewed in Fig. 9, and upwardly through the right-hand preheater tubes in the manner of a conventional return flow condenser structure. From the right-hand preheater tubes, the well stream is carried by a conductor 140 into the upper portion of the separator 86, as described in Fig. 7.

The clean oil withdrawn through the outlet conductor 116 is conveyed into the shell side of the preheater 134 and removed from the lower end thereof through an outlet pipe 141 and flow control valve 142.

Gases and vapors evolved within the lower portion of the emulsion treater of Fig. 9 are carried upwardly through the pipe 121 into the chamber 84 in the manner of the modification of Fig. 7, and are withdrawn from the chamber 84 along with gases separated in said chamber through a gas and vapor outlet pipe 143 leading to the shell side of the condenser 133, the uncondensed vapors and gases being withdrawn from the condenser through an outlet pipe 144 and flow control valve 145.

Of course, portions of the evolved vapors will be condensed upon the relatively cool underside of the partition 83, and further condensation will occur within the chamber 84, especially upon the lower portion or section of the separator 86 which projects downwardly into the chamber 84. Final condensation of those recoverable and retainable liquids will be carried out in the condenser 133, and these condensates are drained from the lower portion of the shell side of the condenser through a pipe 146 leading downwardly and through the wall of the vessel 79 below the partition 83 to a point spaced well below the surface of the clean oil layer. Accordingly, any water particles which may be present in the condensate are returned to the lower portion of the vessel 79 at a point removed from the surface of the clean oil layer so that the water may separate and flow downwardly for removal through the water outlet pipe 125, and contamination of the clean oil by such water will be avoided.

The modification of Fig. 10 is very similar to that of Fig. 9 with the exception that the pipe 121 functions primarily as a pressure equalizer pipe, the vapors and gases evolved in the lower portion of the treating vessel being carried off through a gas outlet conductor 147 extending from the vessel from immediately beneath the partition 83 upwardly into the shell side of the condenser 133. Gases evolved in the chamber 84 are carried off through a separate gas outlet pipe 148 which bypasses the condenser 133 and is connected into the gas outlet pipe 144 leading from the condenser. This structure, under some operating conditions, has advantages over the structure of Fig. 9 in that the relatively rich gases and vapors evolved in the lower portion of the treating vessel are not commingled with the relatively large volume of lean gas present within the chamber 84, and accordingly, condensation of liquefiable and retainable light hydrocarbons from the rich vapors and gases in the condenser 33 is rendered more effective and more efficient. The condenser is not burdened with the load of the volume of gases evolved in the chamber 84, which may be fairly large, and its condensing capacity is reserved exclusively for the rich vapors and gases evolved in the heating and treating section of the treating vessel.

In the form of the invention illustrated in Fig. 11, essentially the general main structure of Fig. 9 is employed insofar as the vessel 79 and separator 86 is concerned. A simple, conventional, preheater or heat exchanger 149 is utilized for passing the well stream entering through the conductor 150 to the separator 86 in heat exchange with the clean oil withdrawn from the vessel 79 through the clean oil outlet pipe 151 before the oil is discharged through the outlet pipe 152 and control valve 153. The lower baffle structure 39, 40, and 41 of Fig. 1 is employed in the lower portion of the treating vessel 79 of Fig. 11, and a well fluids conducting flume 154 extends downwardly from the partition 83 and through the baffle 39 for delivering well fluids therebeneath. A hood or partition 155 overlies the fire tube 108 and has a gas and vapor conductor 156 extending upwardly to a point immediately beneath the partition 83. The separated water is withdrawn through the water outlet pipe 125 and valve 126, while gases and vapors uncondensed upon the underside of the partition 83, pass upwardly through the gas outlet pipe 121 which extends from the partition 83 vertically to the upper portion of the chamber 84.

Considerable quantities of liquids at relatively cool temperatures will be present at all times in the lower portion of the chamber 84 prior to flowing downwardly through the flume 154, and a multi-turn gas and vapor cooling coil 157 is provided immediately above the partition 83, the inlet 158 of the coil being positioned closely beneath the head 80 so as to receive the combined flow of commingled gases and vapors from both the upper and lower chambers of the treating vessel for conducting such gases and vapors through the cooling coil 157 for condensation of liquefiable components. The coil 157 presents a quite large expanse of heat exchange area or surface to the fluids present within the chamber 84, and effective and efficient condensation of hydrocarbon components will necessarily result. The coil 157 discharges externally of the vessel 79 into a small separator or trap 159 having a separated liquids discharge conductor 160 extending downwardly in the vessel 79 to a point well below the surface of the clean oil layer, and also having a gas outlet conductor 161 discharging through a suitable back pressure valve 162. The operation of this form of the invention is substantially the same as those previously described, it being pointed out that the relatively large size and diameter of the chamber 84 will permit the inclusion of many turns of the cooling coils 157 in the lower portion of the chamber so that most effective and complete cooling of the separated gases and condensation of liquefiable fractions therefrom may be carried out.

The form of the invention illustrated in Fig. 12 is substantially the same as that of Fig. 11 with the exception that the inlet 163 to the cooling coil 157 opens downwardly through the partition 83 so that only the gases and vapors evolved in the lower portion of the treating vessel are conducted through the cooling coil, the gas separated in the chamber 84 being withdrawn through a separate gas outlet pipe 164 which bypasses the separator or trap 159 and is connected into the gas outlet pipe 161 downstream of the trap. Here again, the condensing capacity of the coil 157 is utilized solely for the gases and vapors evolved in the lower portion of the treater, the relatively lean and large volume of gases separated in the chamber 84 being separately withdrawn and carried around the cooling coil 157 to avoid overloading of the latter.

The form of the invention shown in Fig. 13 is rather similar to that of Figs. 7 and 8 with the exception of the condenser 88 of Fig. 8 and the gas discharge line 123 and 127. In the modification of Fig. 13, the clean oil is discharged through the outlet conductor 116 into the upper portion of the tube side of the preheater 87' and discharged from the lower end thereof through the outlet pipe 117 and control valve 118. The emulsified well fluids pass downwardly from the chamber 84 through the drain conductor 104 to the shell side of the preheater and are discharged at the lower end of the preheater through the pipe 105 into the lower portion of the emulsion heating and treating chamber 85, just as in Figs. 7 and 8.

In place of the external condenser 88, a tube sheet and condenser tube structure 165 is positioned in the lower portion of the separator 86, and a gas and vapor conductor 166 leads from the upper portion of the chamber 85 through the partition 83 into the shell side of the condenser 165. A condensate drain 167 leads from the opposite side of the condenser downwardly toward the partition 83, and an uncondensed gas and vapor discharge elbow 168 extends from the upper portion of the condenser upwardly toward the head 80. The uncondensed vapors and gases flowing from the condenser into the chamber 85 commingle with the gas separated therein and are withdrawn through a gas outlet pipe 169 leading from the upper portion of the chamber 84 and extending through a gas control discharge valve 170.

The fluids entering the upper portion of the separator 86 flow thereinto through a well stream inlet pipe 171 which opens into the upper portion of the separator through the diverter baffle 92, the fluids flowing downwardly over the baffle and partition 93 and passing through the tubes of the condenser 165 onto the bottom of the separator 86, thus cooling both the tubes and the lower portion of the separator enclosure. Obviously, the vapors and gases passing through the shell side of the condenser 165 are thoroughly cooled by this intimate and extended heat exchange relationship with the relatively cool well fluids, and quantities of retainable light hydrocarbons will be condensed therefrom. The separated liquids discharge conductor 94' leads from the bottom of the separator 86 beneath the condenser 165, upwardly through the condenser and through the control valve 95 to the diverter box 96 provided in the upper portion of the second separating chamber 84.

The operation of this form of the invention is essentially that of the forms illustrated and described in conjunction with Figs. 7 and 8, the condenser 165 offering amplified heat exchange surfaces or area for more effective cooling of the evolved vapors and gases, the exterior of the lower portion of the separator 86 being employed for condensing retainable liquids from the gases separated in the chamber 84 as well as the vapors and gases passing upwardly through the pipe or flume 120 from the partition 109. All condensates, as well as any dirty oil or emulsified fluid which may surge upwardly through the flume 120 are returned onto the head 83 for discharge downwardly through the pipe 104 and the preheater 87' into the lower portion of the treating chamber 85 for resolution into water and clean oil components.

The form of the invention shown in Fig. 14 is similar in a number of respects to that of Fig. 7, differing primarily in the condenser structure for evolved vapors and the arrangement of certain of the vents extending upwardly from the emulsion treating section. The first stage separator enclosure 86 is mounted in the head 80, just as in the modification of Fig. 7, the lower head 83 defining the bottom of the second stage separator enclosure 84 and the upper wall of the emulsion treating zone 85. The incoming well stream or emulsion stream is conducted into the enclosure 86 through the pipe 172 and separated into a gas fraction removed through the gas outlet pipe 173 and passing through the gas outlet valve 174 and back pressure valve 175 into the upper portion of the second stage separator enclosure 84. Collected oil is withdrawn from the enclosure 86 through a suitable outlet pipe 176 and oil outlet valve 177. As previously described, the valves 174 and 177 are controlled by the float 103 positioned within the enclosure 86. Gas removed in the enclosure 84 is withdrawn through an outlet pipe 178 and jacket 179 surrounding the emulsion inlet pipe 172, while separated liquids are drawn off through the pipe 104 to the tube side of the heat exchanger 87, clean oil being withdrawn through the weir box 115 to the shell side of the heat exchanger.

A gas vent pipe or flume 180 extends upwardly from the water knockout section (not shown in Fig. 14) provided in the bottom of the treating section 85, and the gas vent pipe 181 extends upwardly through the flume 180 from the vapor collecting hood provided above the heating means or fire tube (not shown in Fig. 14). A second gas vent pipe 182 extends from the upper portion of the section 85 upwardly through the head 83, both the vent pipes 181 and 182 being connected into a combined gas conductor and drain 183 extending from a point closely above the partition 83 upwardly through a collar 184 having a closed upper end and being positioned in the bottom of the enclosure 86. Both the pipe 183 and collar 184 are connected into a hollow platelike heat exchange enclosure 185 depending within the enclosure 86 from a transverse baffle 186 and forming with the baffle a quieting zone within which the float 103 is positioned. Liquids are constantly being flowed downwardly over the walls of the heat exchange enclosure 185, and the major portion thereof will be constantly immersed in liquid. Accordingly, gases and vapors rising through the pipes 181 and 182 as well as gases and vapors flowing through the collar 184 into the interior from the upper portion of the second stage separator 84, will be cooled and subjected to condensation for maximum recovery of light hydrocarbons. These condensates will pass downwardly for admixture with the separated liquids within the enclosure 84.

It sometimes occurs that the gas outlet valves in this type of structure either freeze under cold weather conditions, or fail to operate properly, and in some instances, quantities of oil have been lost through the gas outlet pipes. With the structure of Fig. 14, such liquids can only pass to the enclosure 84, and accordingly are not lost, the positioning of the enclosure 86 on top of the enclosure 84 permitting gravity flow of these liquids so that their conservation is insured. At the same time, the positioning of the lower portion of the enclosure 86 in the enclosure 84 will prevent the freezing of any water which may tend to accumulate in the bottom of the enclosure 84, a result that would not be achieved if the structures were of a separate nature.

It sometimes also occurs that excessive quantities of liquid may accumulate in the enclosure 84, and in this case, the liquids will simply overflow downwardly through the flume 180 for conveyance to the water knockout section in the bottom of the treating portion of the unit.

It is also pointed out that any of the various modifications of the invention may employ the modified water discharge tank 65 illustrated in Fig. 2, that conventional water leg structures as well known in this art may be employed, or that any other suitable or desirable type of water discharge arrangement may be utilized.

It is further pointed out that nearly all of the various modifications of the invention return light hydrocarbon fractions liquefied in the condenser structure to the emulsified stream passing into the lower portion of the heating and treating chamber. These light fractions tend to accumulate through a recycling effect and will thus dilute the crude petroleum to facilitate its treating and the removal of gas therefrom as well as the settling of sand or any other foreign material which may be present in the well stream. In each form of the invention, the operating pressure within the treating chamber is desirably maintained at a level at which treating temperatures of 100 to 250 degrees Fahrenheit may be employed, and preferably, temperatures of 125 to 180 degrees Fahrenheit, the second separating stage being normally maintained at the same operating pressure while the first separating stage will be maintained at a pressure, as set forth hereinbefore, determined by the composition of the well fluids and the operating conditions and pressures under which the well is being produced. In all cases, most effective gas separation is made in the first and second separating stages with the remaining well stream being delivered to the treating chamber for resolution into clean oil and a gas and vapor fraction which may be passed through a condenser for liquefaction of those light hydrocarbons which may be retained in storage. The remaining fixed gases and very light fractions are discharged. It is pointed out that light hydrocarbons are more readily held in storage in admixture with heavier fractions, and that certain quantities of gas and very light hydrocarbons may readily be held in storage in solution in such an admixture. It is not the purpose of this invention to remove all gas from the clean oil, but rather to deliver to the stock tanks a clean oil having therein an optimum or maximum of light ends and carrying in solution such quantities of fixed gases, such as ethane and propane, and some methane, as may be held in the oil under storage conditions without harmful evolution of gas and stripping of the oil of its light ends.

It is further pointed out that the enclosing or partial enclosing of the first stage separator within the second stage separator protects the former against freezing, permits gravity flow from the first stage to the second when conditions therefor occur, and also provides a condensing surface in the second stage separator for evolved vapors under certain types of well stream conditions. In some modifications of the invention, this structure also provides for conservation of oil should the gas valve of the first stage lodge in an open position.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of treating emulsified well streams including, flowing the emulsified stream into a higher pressure gas separation zone and withdrawing gas in this zone at an elevated pressure, accumulating separated liquids in the higher pressure zone and withdrawing said liquids to a lower pressure gas separation zone, passing gas separated in the lower pressure zone in heat exchange relationship with fluids passing through the high pressure zone, withdrawing liquids separated in the lower pressure zone to a heating and treating zone and therein heating said liquids, withdrawing water and clean oil, withdrawing gas from the heating and treating zone at a pressure below that at which gas is withdrawn from the higher pressure zone, and passing the gas withdrawn from the heating and treating zone in heat exchange relationship with at least a portion of the well stream prior to the flowing of the latter into the heating and treating zone.

2. The method of treating emulsified well streams including, flowing the emulsified stream into a higher pressure gas separation zone at a pressure of 25 to 250 pounds per square inch gauge and withdrawing gas in this zone, accumulating separated liquids in this zone and withdrawing said liquids to a lower pressure gas separation zone at a pressure of 2 to 25 pounds per square inch gauge, passing gas separated in the lower zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone while passing the gas in heat exchange relationship with the liquids separated in the higher pressure zone, and passing the gas withdrawn from the heating and treating zone in heat exchange relationship with at least a portion of the well stream prior to the flowing of the latter into the heating and treating zone.

3. The method of treating emulsified well streams including, flowing the emulsified stream into a higher pressure gas separation zone and withdrawing gas in this zone at an elevated pressure, accumulating separated liquids in the higher pressure zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone at a pressure below that at which gas is withdrawn from the higher pressure zone, and passing the gas withdrawn from the heating and treating zone in heat exchange relationship with the well stream prior to the flowing of the latter into the first gas separation zone.

4. The method of treating emulsified well streams of known composition and flowing pressure including, flowing the emulsified well stream into a higher pressure separation zone maintained at optimum pressure for an initial gas separation step for the well stream being flowed, withdrawing gas separated in the higher pressure zone at an elevated pressure, withdrawing liquids separated in the higher pressure zone and flowing said liquids into a lower pressure separation zone maintained at optimum pressure for the next consecutive gas separation step for the well stream being flowed, withdrawing gas from the lower pressure separation zone, flowing liquids separated in the lower pressure separation zone to a heating zone and therein heating said liquids, withdrawing water and clean oil from the heating zone and flowing the clean oil to storage vessels maintained at optimum pressure for the terminal gas separation step for the well stream being flowed, and withdrawing gas from the heating zone at a pressure below that at which gas is withdrawn from the higher pressure zone and passing the lower pressure gas in heat exchange relation with at least a portion of the well stream prior to the flowing of the latter into the heating zone.

5. The method of treating emulsified well streams of known composition and flowing pressure including, flowing the emulsified well stream into a higher pressure separation zone maintained at optimum pressure for an initial gas separation step for the well stream being flowed, withdrawing gas separated in the higher pressure zone at an elevated pressure, withdrawing liquids separated in the higher pressure zone and flowing said liquids into a lower pressure separation zone at least partially enclosing the higher pressure separation zone and maintained at optimum pressure for the next consecutive gas separation step for the well stream being flowed, withdrawing gas from the lower pressure separation zone, flowing liquids separated in the lower pressure separation zone to a heating zone and therein heating said liquids, withdrawing water and clean oil from the heating zone and flowing the clean oil to storage vessels maintained at optimum pressure for the terminal gas separation step for the well stream being flowed, and withdrawing gas from the heating zone at a pressure below that at which gas is withdrawn from the higher pressure zone and passing the lower pressure gas in heat exchange relation with at least a portion of the well stream prior to the flowing of the latter into the heating zone.

6. The method of treating emulsified well streams of known composition and flowing pressure including, flowing the emulsified well stream into a higher pressure separation zone maintained at optimum pressure for an initial gas separation step for the well stream being flowed, withdrawing gas separated in the higher pressure zone at an elevated pressure, withdrawing liquids separated in the higher pressure zone and flowing said liquids into a lower pressure separation zone maintained at optimum pressure for the next consecutive gas separation step for the well stream being flowed, withdrawing gas from the lower pressure separation zone, flowing liquids separated in the lower pressure separation zone to a heating zone maintained at the pressure of the lower pressure separating zone and therein heating said liquids, withdrawing water and clean oil from the heating zone and flowing the clean oil to storage vessels maintained at optimum pressure for the terminal gas separation step for the well stream being flowed, and withdrawing gas from the heating zone at a pressure below that at which gas is withdrawn from the higher pressure zone and passing the lower pressure gas in heat exchange relation with at least a portion of the well stream prior to the flowing of the latter into the heating zone.

7. The method of treating emulsified well streams of known composition and flowing pressure including, flowing the well stream through a condensing zone, then flowing the emulsified well stream into a higher pressure separation zone maintained at optimum pressure for an initial gas separation step for the well stream being flowed, withdrawing gas separated in the higher pressure zone, withdrawing liquids separated in the higher pressure zone and flowing said liquids into a lower pressure separation zone maintained at optimum pressure for the next consecutive gas separation step for the well stream being flowed, withdrawing gas from the lower pressure separation zone, flowing liquids separated in the lower pressure separation zone to a heating zone and therein heating said liquids, withdrawing water and clean oil from the heating zone and flowing the clean oil to storage vessels maintained at optimum pressure for the terminal gas separation step for the well stream being flowed, and withdrawing gas from the heating zone in heat exchange relation with the well stream flowing through the condensing zone, and recovering the condensates occurring in the condensing zone.

8. The method of treating emulsified well streams including, flowing the emulsified stream into a higher pressure gas separation zone and withdrawing gas in this zone at an elevated pressure, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone at a pressure below that at which gas is withdrawn from the higher pressure zone while passing the lower pressure gas in heat exchange relationship with the liquids separated in the lower pressure zone, and passing the gas withdrawn from the heating and treating zone in heat exchange relationship with at least a portion of the well stream prior to the flowing of the latter into the heating and treating zone.

9. The method of treating emulsified well streams including, flowing the emulsified stream into a higher pressure gas separation zone at a pressure of 25 to 250 pounds per square inch gauge and withdrawing gas in this zone, accumulating separated liquids in this zone and withdrawing said liquids to a lower pressure gas separation zone at a pressure of 2 to 25 pounds per square inch gauge, passing gas separated in the lower zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone and passing the gas withdrawn from the heating and treating zone in heat exchange relationship with at least a portion of the well stream prior to the flowing of the latter into the heating and treating zone.

10. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil while maintaining the heating and treating zone free of water, withdrawing gas from the heating and treating zone, and passing the gas withdrawn from the heating and treating zone in heat exchange relationship with at least a portion of the well stream prior to the flowing of the latter into the heating and treating zone.

11. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone to the lower pressure gas separation zone, and passing the gas withdrawn from the heating and treating zone with the gas from the lower pressure gas separation zone in heat exchange relationship with at least a portion of the well stream prior to the flowing of the latter into the heating and treating zone.

12. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone, and passing the gas withdrawn from the heating and treating zone in heat exchange relationship with at least a portion of the well stream prior to the flowing of the latter into the heating and treating zone, withdrawing gas evolved at the point of heating the liquids in the heating and treating zone, and passing the latter gas in heat exchange relationship with the higher pressure gas separation zone.

13. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone to the lower pressure gas separation zone, and passing the gas withdrawn from the heating and treating zone with the gas from the lower pressure gas separation zone in heat exchange relationship with at least a portion of the well stream prior to the flowing of the latter into the heating and treating zone, withdrawing gas evolved at the point of heating the liquids in the heating and treating zone, and passing the latter gas in heat exchange relationship with the higher pressure gas separation zone.

14. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone, and passing the gas withdrawn from the heating and treating zone in heat exchange relationship with the well stream prior to the flowing of the latter into the higher pressure gas separation zone.

15. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone to the lower pressure gas separation zone, and passing the gas withdrawn from the heating and treating zone with the gas from the lower pressure gas separation zone in heat exchange relationship with the well stream prior to the flowing of the latter into the higher pressure gas separation zone.

16. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, and withdrawing gas from the heating and treating zone while passing the gas in amplified and extended heat exchange relationship with the liquids separated in the lower pressure zone.

17. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, and withdrawing gas from the heating and treating zone to the lower pressure gas separation zone while passing the gas in amplified and extended heat exchange relationship with the liquids separated in the higher pressure zone.

18. The method of treating emulsified well streams including, flowing the emulsified stream into a higher pressure gas separation zone and withdrawing gas in this zone, accumulating separated liquids in this zone and withdrawing said liquids to a lower pressure gas separation zone, flowing the gas separated in the higher pressure gas separation zone to the lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone, and passing the gas withdrawn from the heating and treating zone in heat exchange relationship with at least a portion of the well stream prior to the flowing of the latter into the heating and treating zone.

19. The method of treating emulsified well streams including, flowing the emulsified stream into a higher pressure gas separation zone and withdrawing gas in this zone, accumulating separated liquids in this zone and withdrawing said liquids to a lower pressure gas separation zone, passing gas separated in the lower pressure zone in heat exchange relationship with fluids passing through the higher pressure zone, withdrawing liquids separated in the lower pressure zone to a heating and treating zone and therein heating said liquids, withdrawing water and clean oil, withdrawing gas from the heating and treating zone while passing the gas in amplified and extended heat exchange relationship with the liquids separated in the higher pressure zone, and passing the gas withdrawn from the heating and treating zone in heat exchange relationship with at least a portion of the well stream prior to the flowing of the latter into the heating and treating zone.

20. An emulsion treating apparatus including, a first oil and gas separator, a second oil and gas separator at least partially enclosing the first separator, a heating chamber having its upper wall in common with the second separator, means for flowing an emulsified well stream into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, means for maintaining the heating chamber at a pressure less than the elevated pressure of the first separator, water and clean oil outlets from the apparatus, and means for flowing gas evolved in the heating chamber in heat exchange relationship with at least a portion of the well liquids prior to the flowing of the latter into the heating chamber.

21. An emulsion treating apparatus including a condenser, means for flowing an emulsified well stream through the condenser, a first oil and gas separator, a second oil and gas separator at least partially enclosing the first separator, a heating chamber having its upper wall in common with the second separator, means for flowing the emulsified well stream from the condenser into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, means for maintaining the heating chamber at a pressure less than the elevated pressure of the first separator, water and clean oil outlets from the apparatus, and means for flowing gas evolved in the heating chamber in heat exchange relationship with the well stream in the condenser.

22. An emulsion treating apparatus as set forth in claim 20, wherein the first separator is a horizontal separator substantially completely enclosed in the second separator.

23. An emulsion treating apparatus as set forth in claim 20, and means for maintaining the heating chamber free of water.

24. An emulsion treating apparatus including, a first oil and gas separator, a second oil and gas separator at least partially enclosing the first separator, a heating chamber having its upper wall in common with the second separator, means for flowing an emulsified well stream into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, water and clean oil outlets from the apparatus, means for flowing gas evolved in the heating chamber to the second separator, and means for flowing gas from the second separator in heat exchange relationship with at least a portion of the well liquids prior to the flowing of the latter into the heating chamber.

25. An emulsion treating apparatus including, a first oil and gas separator, a second oil and gas separator at least partially enclosing the first separator, a heating chamber having its upper wall in common with the second separator, means for flowing an emulsified well stream into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, water and clean oil outlets from the apparatus, means for flowing gas evolved in the heating chamber in heat exchange relationship with at least a portion of the well liquids prior to the flowing of the latter into the heating chamber, means for withdrawing gas evolved at the point of heating the liquids in the heating chamber, and means for passing the latter gas into close proximity with the exterior of the first separator.

26. An emulsion treating apparatus including, a first oil and gas separator, a second oil and gas separator at least partially enclosing the first separator, a heating chamber having its upper wall in common with the second separator, means for flowing an emulsified well stream into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, water and clean oil outlets from the apparatus, means for flowing gas from the second separator in heat exchange relationship with at least a portion of the well liquids prior to the flowing of the latter into the heating chamber, means for withdrawing gas evolved at the point of heating the liquids in the heating chamber, and means for passing the latter gas into close proximity with the exterior of the first separator.

27. An emulsion treating apparatus including a condenser, means for flowing an emulsified well stream through the condenser, a first oil and gas separator, a second oil and gas separator at least partially enclosing the first separator, a heating chamber having its upper wall in common with the second separator, means for flowing the emulsified well stream from the condenser into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, water and clean oil outlets from the apparatus, means for flowing gas evolved in the heating chamber to the second separator, and means for flowing gas from the second separator in heat exchange relationship with the well stream in the condenser.

28. An emulsion treating apparatus including, a first oil and gas separator, a second oil and gas separator at least partially enclosing the first separator, a heating chamber having its upper wall in common with the second separator, means for flowing an emulsified well stream into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, water and clean oil outlets from the apparatus, a heat exchange coil in the second separator, and means for flowing gas evolved in the heating chamber in heat exchange relationship with at least a portion of the well liquids prior to the flowing of the latter into the heating chamber by passing the latter gas through the coil.

29. An emulsion treating apparatus including, a first oil and gas separator, a second oil and gas separator at least partially enclosing the first separator, a heating chamber having its upper wall in common with the second separator, means for flowing an emulsified well stream into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, water and clean oil outlets from the apparatus, a heat exchange coil in the second separator, means for flowing gas evolved in the heating chamber to the second separator, and means for flowing gas from the second separator in heat exchange relationship with at least a portion of the well liquids prior to the flowing of the latter into the heating chamber by passing the latter gas through the coil.

30. An emulsion treating apparatus including, a first oil and gas separator, a second oil and gas separator at least partially enclosing the first separator, a heating chamber having its upper wall in common with the second separator, means for flowing an emulsified well stream into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, water and clean oil outlets from the apparatus, a heat exchange enclosure in the first separator, and means for flowing gas evolved in the heating chamber in heat exchange relationship with at least a portion of the well liquids prior to the flowing of the latter into the heating chamber by passing the latter gas through the enclosure.

31. An emulsion treating apparatus including, a first oil and gas separator, a second oil and gas separator at least partially enclosing the first separator, a heating chamber having its upper wall in common with the second separator, means for flowing an emulsified well stream into the first separator and withdrawing gas and liquid therefrom, means for maintaining the first separator at an elevated pressure, means for flowing separated liquids from the first separator to the second separator at a reduced pressure and withdrawing gas and liquid therefrom, means for flowing liquids from the second separator to the heating chamber and therein heating the liquids, water and clean oil outlets from the apparatus, a tube and shell condenser in the first separator, and means for flowing gas evolved in the heating chamber in heat exchange relationship with at least a portion of the well liquids prior to the flowing of the latter into the heating chamber by passing the latter gas through the condenser.

References Cited in the file of this patent

UNITED STATES PATENTS

| | | |
|---|---|---|
| 2,384,222 | Walker | Sept. 4, 1945 |
| 2,713,919 | Walker et al. | July 26, 1955 |
| 2,765,045 | Meyers | Oct. 2, 1956 |
| 2,808,123 | Walker | Oct. 1, 1957 |